US012580318B2

(12) United States Patent
Kawasaki

(10) Patent No.: US 12,580,318 B2
(45) Date of Patent: Mar. 17, 2026

(54) ANTENNA DEVICE, RADAR DEVICE, AND TRANSFER DEVICE

(71) Applicant: Sony Group Corporation, Tokyo (JP)

(72) Inventor: Kenichi Kawasaki, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 70 days.

(21) Appl. No.: 18/832,944

(22) PCT Filed: Feb. 1, 2023

(86) PCT No.: PCT/JP2023/003295
§ 371 (c)(1),
(2) Date: Jul. 25, 2024

(87) PCT Pub. No.: WO2023/149491
PCT Pub. Date: Aug. 10, 2023

(65) Prior Publication Data

US 2025/0158286 A1 May 15, 2025

(30) Foreign Application Priority Data

Feb. 4, 2022 (JP) ................................ 2022-016507

(51) Int. Cl.
*H01Q 13/08* (2006.01)
*H01P 1/20* (2006.01)
(Continued)

(52) U.S. Cl.
CPC ........... *H01Q 13/08* (2013.01); *H01P 1/2005* (2013.01); *H01P 5/107* (2013.01); *H01Q 15/006* (2013.01);
(Continued)

(58) Field of Classification Search
CPC ......... H01Q 15/006; H01Q 13/08-085; H01Q 13/206; H01Q 1/3233; H01Q 21/0043; H01Q 21/0075; H01P 1/2005; H01P 5/107
See application file for complete search history.

(56) References Cited

U.S. PATENT DOCUMENTS 10,236,591 B2 * 3/2019 Kirino .................... H01Q 21/06
10,608,345 B2 * 3/2020 Kirino ....................... G01S 1/00
(Continued)

FOREIGN PATENT DOCUMENTS

CN 112259944 A * 1/2021 ................ H01P 3/16
CN 114243275 A * 3/2022 ............. H01Q 1/273
(Continued)

OTHER PUBLICATIONS

Rahimi, Mohammad Reza, et al., "Millimeter-Wave Substrate Integrated Gap Waveguide Leaky-Wave Antenna for WiGig Applications", IEEE, USA, vol. 67, No. 9, Sep. 1, 2019, pp. 5790-5800, XP011744383.
(Continued)

*Primary Examiner* — Ab Salam Alkassim, Jr.
(74) *Attorney, Agent, or Firm* — XSENSUS LLP

(57) ABSTRACT

An antenna device includes a board including a conductor layer, a first conductor pattern arranged on a surface of the board, a connecting section that connects the first conductor pattern to the conductor layer, a second conductor pattern that has one end side connected to one end side of the first conductor pattern and has a length which is equal to or longer than approximately ¼ of an operating wavelength, multiple first electromagnetic bandgap elements arranged on both sides of the first conductor pattern in a longitudinal direction on the board, multiple second electromagnetic bandgap elements arranged on both sides of the second conductor pattern in a longitudinal direction on the board, a
(Continued)

conductor plate that faces the first conductor pattern, and a third conductor pattern that has one end side connected to another end side of the second conductor pattern and is arranged on the surface of the board.

18 Claims, 24 Drawing Sheets

(51) Int. Cl.

| | |
|---|---|
| ***H01P 5/107*** | (2006.01) |
| ***H01Q 15/00*** | (2006.01) |
| *H01P 3/123* | (2006.01) |
| *H01Q 1/32* | (2006.01) |
| *H01Q 21/00* | (2006.01) |

(52) U.S. Cl.

CPC ........... *H01P 3/123* (2013.01); *H01Q 1/3233* (2013.01); *H01Q 21/0043* (2013.01)

(56) References Cited

U.S. PATENT DOCUMENTS

| | | | | |
|---|---|---|---|---|
| 10,622,696 | B2 * | 4/2020 | Kamo | H01P 3/123 |
| 11,061,110 | B2 * | 7/2021 | Kamo | G01S 7/03 |
| 2012/0119932 | A1 * | 5/2012 | MacDonald | H01Q 1/425 342/1 |
| 2012/0119969 | A1 * | 5/2012 | MacDonald | H01Q 1/3233 343/841 |
| 2019/0006743 | A1 * | 1/2019 | Kirino | H01Q 1/2283 |
| 2019/0058232 | A1 * | 2/2019 | Fruehling | H01P 7/065 |
| 2020/0076038 | A1 * | 3/2020 | Kamo | H01P 3/123 |
| 2020/0168974 | A1 * | 5/2020 | Vosoogh | H01P 1/2005 |
| 2020/0185804 | A1 * | 6/2020 | Watanabe | G01S 13/584 |
| 2021/0242581 | A1 * | 8/2021 | Rossiter | H01Q 21/061 |
| 2024/0162629 | A1 * | 5/2024 | Li | H01Q 21/065 |

FOREIGN PATENT DOCUMENTS

| | | | | |
|---|---|---|---|---|
| CN | 115020953 | A * | 9/2022 | H01P 5/107 |
| DE | 102017102349 | B4 * | 5/2022 | H01Q 9/0485 |
| EP | 2945222 | A1 * | 11/2015 | H01P 1/2005 |
| EP | 3888186 | B1 * | 10/2023 | H01Q 21/065 |
| JP | 2017-519404 | A | 7/2017 | |
| JP | 2020-532891 | A | 11/2020 | |
| WO | WO-2024132675 | A1 * | 6/2024 | H01P 3/123 |
| WO | WO-2025018046 | A1 * | 1/2025 | H01P 5/08 |

OTHER PUBLICATIONS

Shi, Chenyun, et al., “A 60GHz Wideband Antenna Array Based on Metasurface with Gap Waveguide (GWG) Divider”, Oct. 3, 2019, pp. 666-669, XP033641848.

Sifat, Syed M, et al., “High Gain Bow-Tie Slot Antenna Array Loaded With Grooves Based on Printed Ridge Gap Waveguide Technology”, IEEE Access, vol. 7, Mar. 4, 2019 (Mar. 4, 2019), pp. 36177-36185, XP011717177.

International Search Report and Written Opinion mailed on Apr. 25, 2023, received for PCT Application PCT/JP2023/003295, filed on Feb. 1, 2023, 11 pages including English Translation.

Razavi et al., “Design of 60GHz Planar Array Antennas Using PCB-based Microstrip-Ridge Gap Waveguide and SIW”, The 8th European Conference on Antennas and Propagation (EuCAP 2014), 2014, pp. 1825-1828.

Sorkherizi et al., “Transition from Microstrip to Printed Ridge Gap Waveguide for Millimeter-Wave Application”, 2015 IEEE International Symposium on Antennas and Propagation & USNC/URSI National Radio Science Meeting, 2015, pp. 1588-1589.

Zhao et al., “Novel Suspended-Line Gap Waveguide Packaged With Stacked-Mushroom EBG Structures”, IEEE Transactions on Microwave Theory and Techniques, vol. 69, Issue 5, May 2021, 11 pages.

* cited by examiner

E-E

ANTENNA DEVICE, RADAR DEVICE, AND TRANSFER DEVICE

CROSS-REFERENCE TO RELATED APPLICATIONS

This application is a national stage application, pursuant to 35 U.S.C. § 371, of International Patent Application No. PCT/JP2023/003295, filed Feb. 1, 2023, which claims priority to Japanese Patent Application No. 2022-016507, filed Feb. 4, 2022, the entire contents of each are incorporated herein by reference.

TECHNICAL FIELD

The present disclosure relates to an antenna device, a radar device, and a transfer device.

BACKGROUND ART

Gap waveguides have been attracting attention as waveguides used for antenna devices. Gap waveguides achieve low loss, and are easy to be manufactured since they need not have a configuration in which they are completely surrounded by a conductor unlike waveguide tubes. For example, an MRGW (Microstrip Ridge Gap Waveguide), which is one type of gap waveguide, and is disclosed in PTL 1 described below can easily realize a gap waveguide since it enables implementation of electromagnetic bandgap (EBG) elements on a board. By using a conductor pattern with a narrow width like a microstrip line in this MRGW, it is possible also to realize a compact and high-performance structure.

For example, a microstrip line can be used as a transfer line for signal input and output between the MRGW and an IC chip for signal transmission and reception. However, a conversion structure for connecting the MRGW and the microstrip line becomes necessary since, while radio waves are propagated on the board in the MRGW, radio waves are propagated in the board on the microstrip line. As such a conversion structure, for example, it is possible also to adopt a configuration in which the MRGW is formed by providing a conductor block to cover the board and the conductor block is connected to the board between the MRGW and the microstrip line. However, it is not easy to precisely connect the conductor block to the board, and it has not been possible to manufacture the conversion structure simply.

CITATION LIST

Patent Literature

[PTL 1]
Japanese Translation of PCT International Application Publication No. JP-T-2017-519404

SUMMARY

Technical Problem

The present disclosure has been made in view of problems like the ones mentioned above, and an object thereof is to provide an antenna device, a radar device, and a transfer device that can easily realize a configuration in which a waveguide and a transfer line are connected.

Solution to Problem

An antenna device of the present disclosure includes a board including a conductor layer, a first conductor pattern arranged on a surface of the board, a connecting section that connects the first conductor pattern to the conductor layer, a second conductor pattern that has one end side connected to one end side of the first conductor pattern and has a length which is equal to or longer than approximately ¼ of an operating wavelength, multiple first electromagnetic bandgap elements arranged on both sides of the first conductor pattern in a longitudinal direction on the board, multiple second electromagnetic bandgap elements arranged on both sides of the second conductor pattern in a longitudinal direction on the board, a conductor plate that faces the first conductor pattern, and a third conductor pattern that has one end side connected to another end side of the second conductor pattern and is arranged on the surface of the board.

DESCRIPTION OF EMBODIMENT

Hereinbelow, a preferred embodiment of the present disclosure is explained in detail with reference to the attached figures. Note that, in the present specification and the figures, constituent elements having substantially identical functional configurations are given identical reference signs, and thereby overlapping explanations thereof are omitted. In addition, in the present specification and the figures, distinctions between multiple constituent elements having substantially identical or similar functional configurations are made by giving them different numerals or alphabets after identical reference signs, in some cases. In addition, in the present specification and the figures, distinctions between multiple constituent elements obtained by subdividing one constituent element are made by giving them different numerals or alphabets after identical reference signs, in some cases. Note that, in a case where it is not necessary to make particular distinctions between respective ones of multiple constituent elements having substantially identical or similar functional configurations, only identical reference signs are given to them.

Hereinbelow, modes for carrying out the present technology are explained. The explanation is given in the following order.

1. Details of Embodiment of the Present Disclosure
2. Modification Examples
3. Overview of Wireless Communication Device
4. Configuration Example of Vehicle Control System
5. Summary
6. Supplementary Notes

1. DETAILS OF EMBODIMENT OF PRESENT DISCLOSURE

Figure 1:
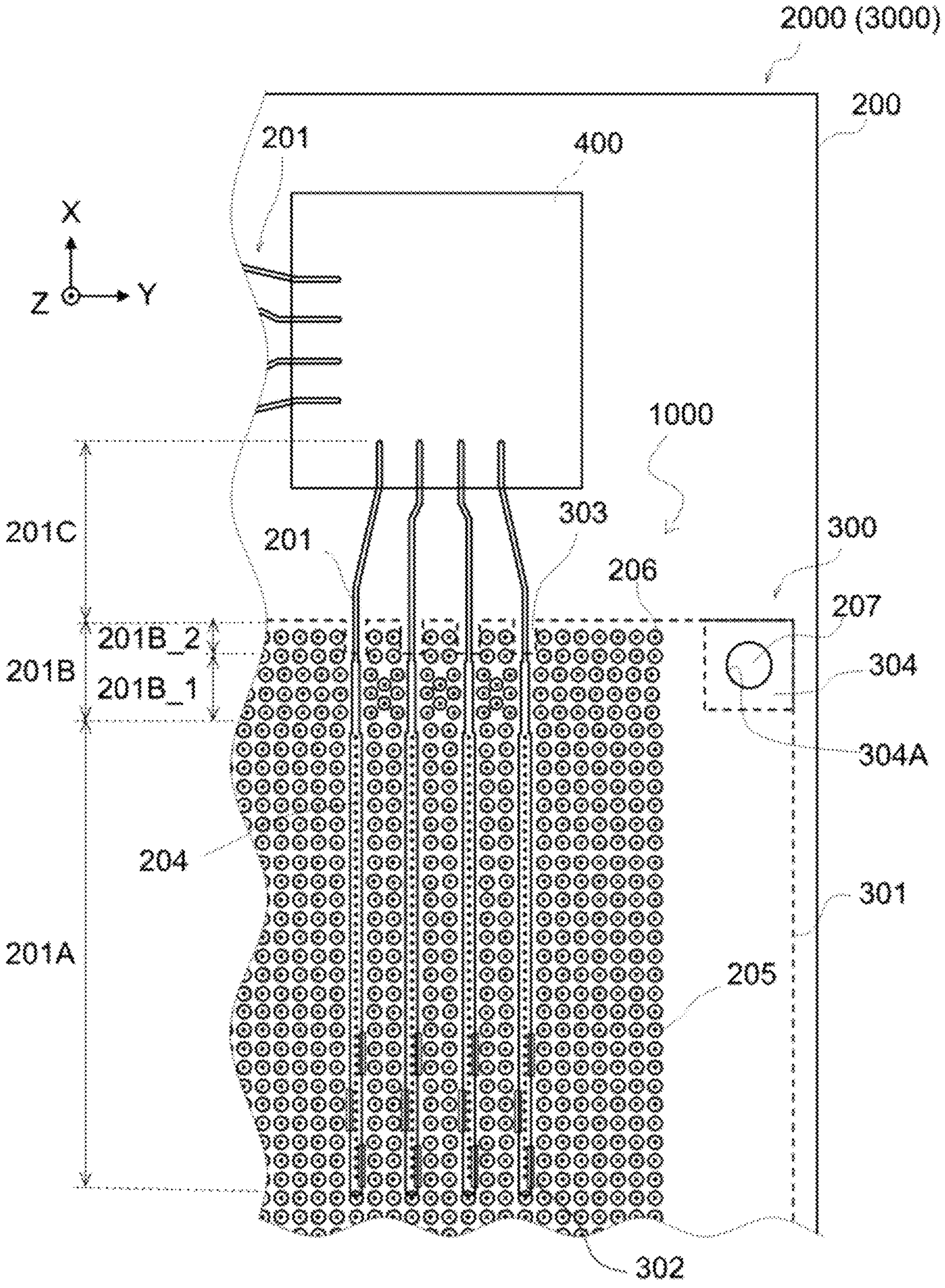
FIG. 1 is a schematic plan view of a radar device including an antenna device according to an embodiment of the present disclosure.
Figure 2:
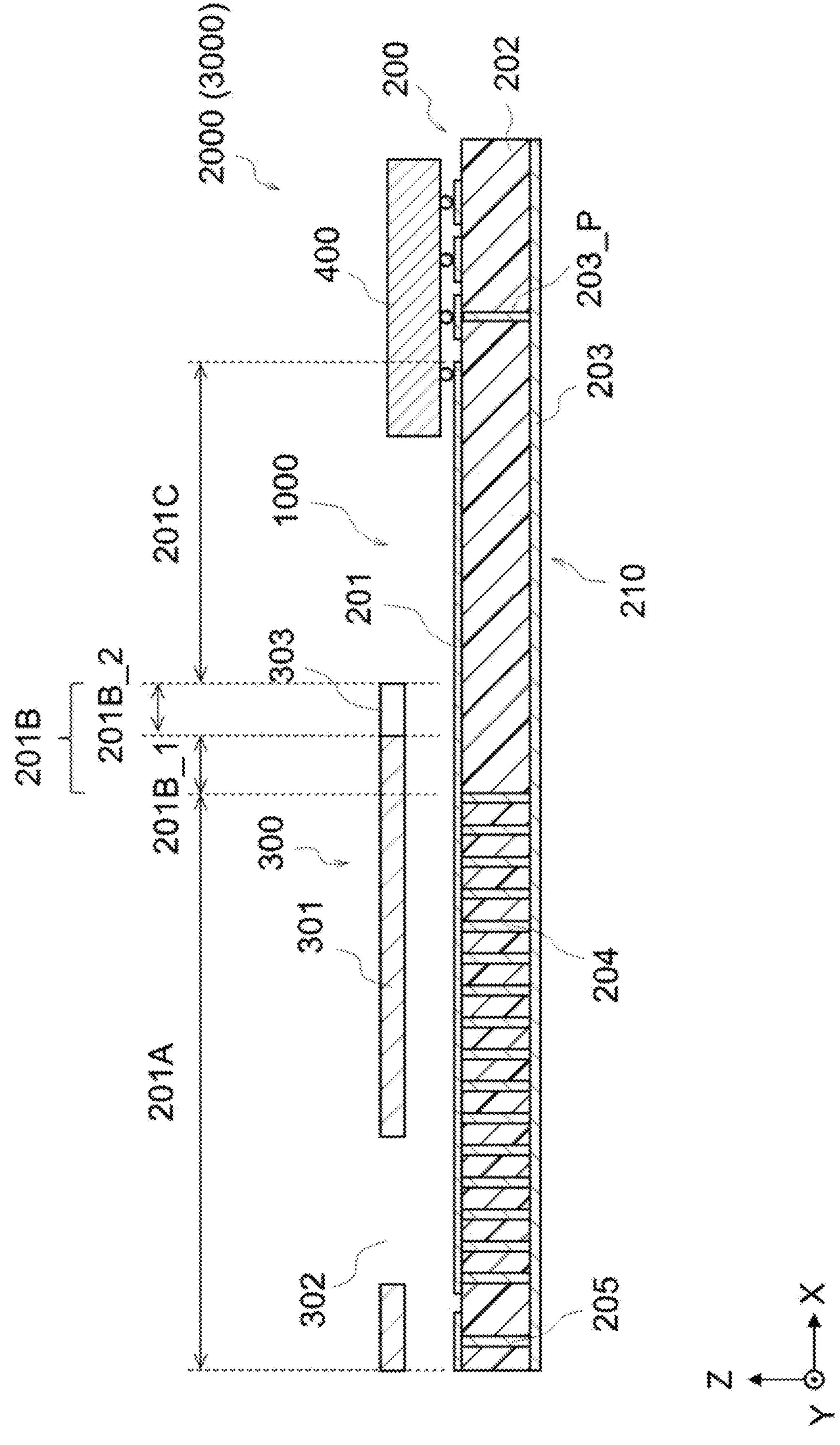
FIG. 2 is a schematic cross-sectional view of the radar device including the antenna device.
Figure 3:
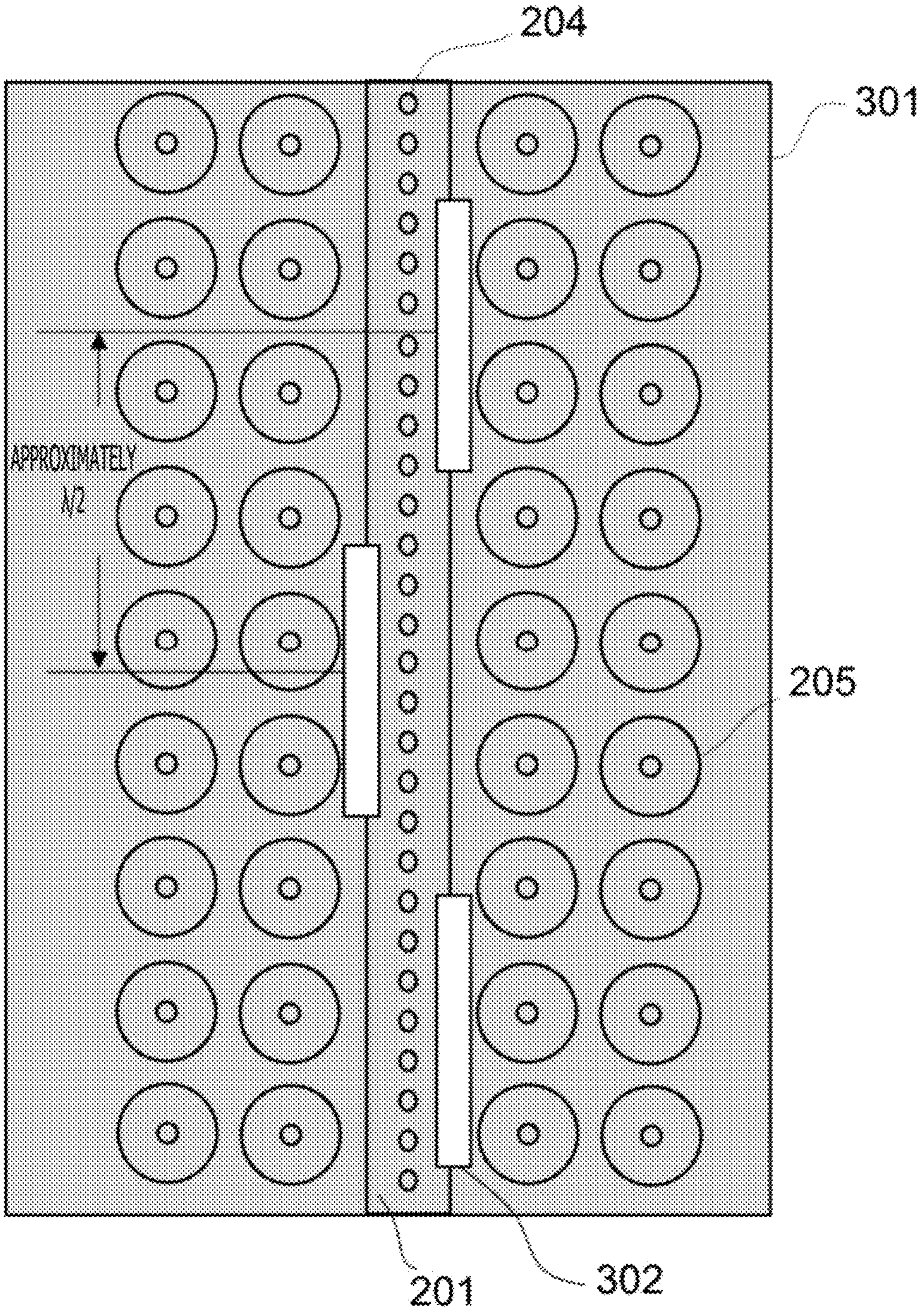
FIG. 3 is an enlarged view of a portion of the device in FIG. 1 where slots are formed through a conductor plate.
Figure 4:
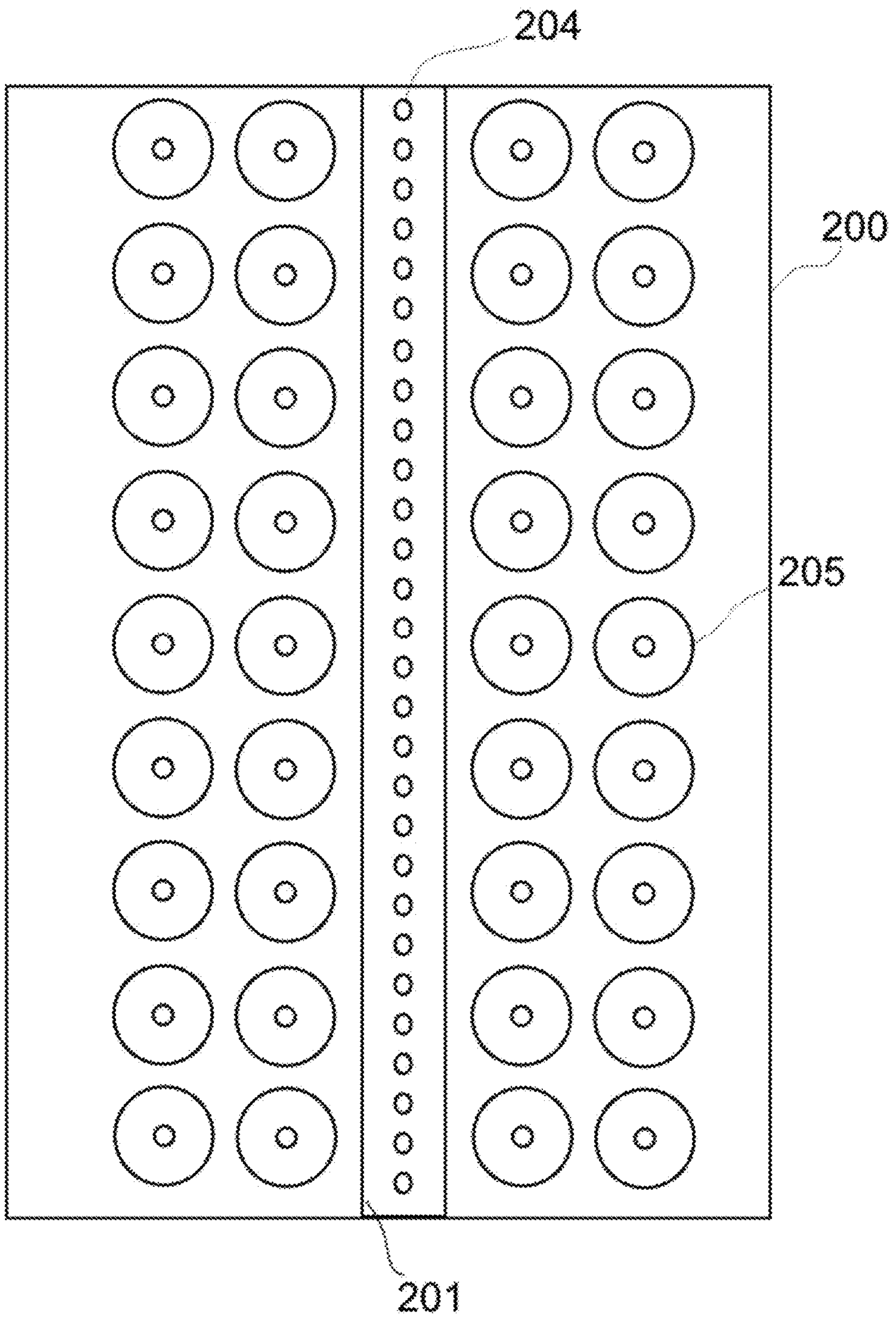
FIG. 4 is a view depicting a configuration depicted in FIG. 3 with the conductor plate being removed therefrom.
Figure 5:
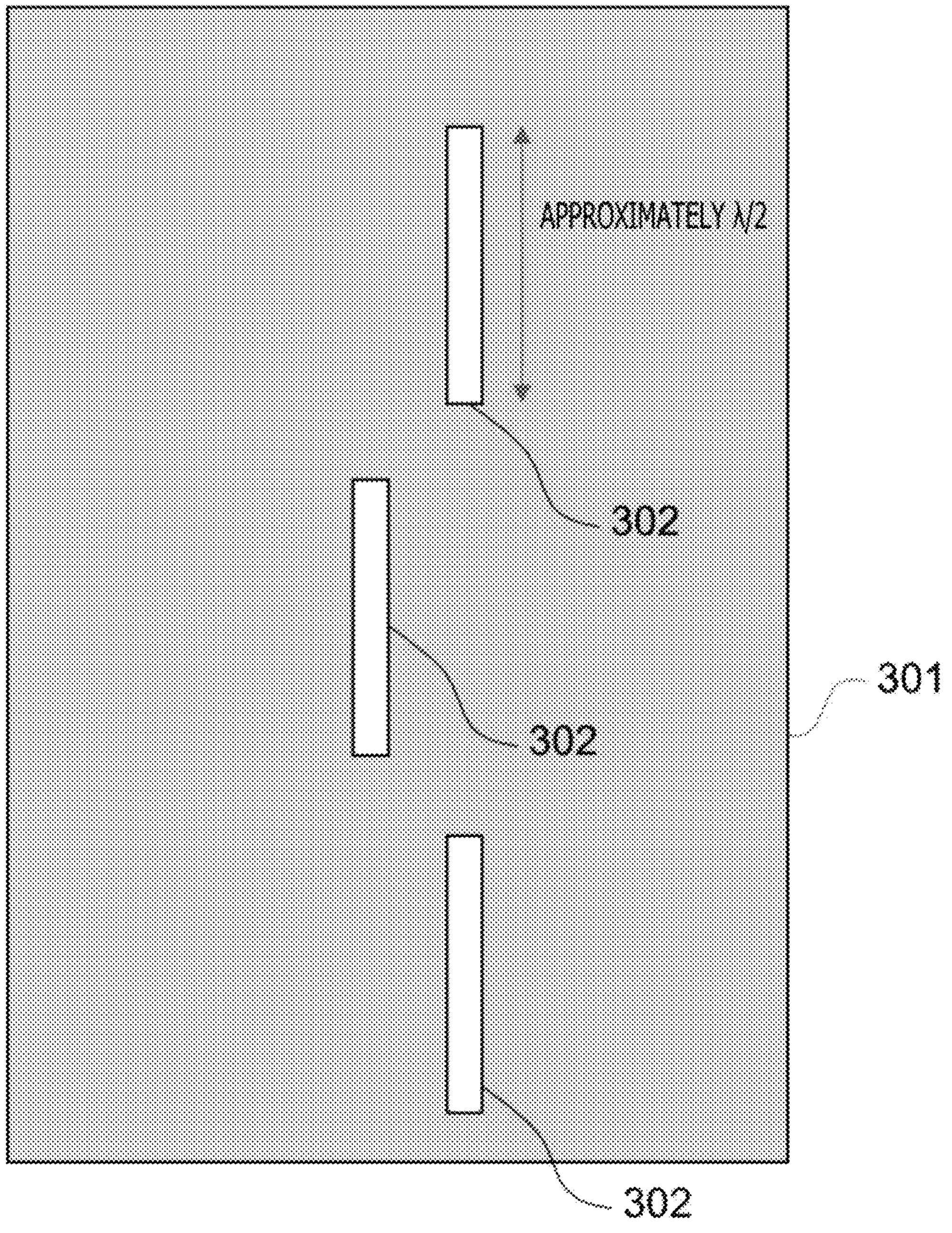
FIG. 5 is a view depicting only the conductor plate in the configuration depicted in FIG. 3.

An embodiment of the present disclosure explained below relates to an antenna device in which a simple connection structure connects a gap waveguide to a transfer line, and a radar device including the antenna device. First, with reference to FIG. 1 and FIG. 2, an overview of an antenna device 1000 and a radar device 2000 in the embodiment of the present disclosure is explained. FIG. 1 is a schematic plan view of the radar device including the antenna device according to the embodiment of the present disclosure. FIG. 2 is a schematic cross-sectional view of the radar device 2000 including the antenna device 1000. FIG. 3 is an enlarged view of a portion, in which slots 240 are formed, of the device in FIG. 1. FIG. 4 is a view depicting a configuration depicted in FIG. 3 with a conductor plate 301 being removed from the configuration. FIG. 5 is a view depicting only the conductor plate in the configuration depicted in FIG. 3.

Note that, in the following explanation, a direction in which the transfer line extends at a portion that functions as an antenna of the antenna device 1000 is defined as the X-axis direction, as depicted in FIG. 1. In addition, a direction parallel to the main surface (surface) of the antenna device 1000 and orthogonal to the X-axis direction is defined as the Y-axis direction. Furthermore, a direction (thickness direction) perpendicular to the main surface of the antenna device 1000 is defined as the Z-axis direction. That is, a direction orthogonal to both the X-axis direction and the Y-axis direction is defined as the Z-axis direction.

As depicted in FIG. 1, the antenna device 1000 includes a board 200, and a structure 300 including a gap waveguide. The structure 300 including the gap waveguide (hereinbelow, the structure 300) mainly includes part of the board 200, and the conductor plate 301 arranged to face the part. The portion of the board 200 that functions as the structure 300 is mainly a portion of the board 200 that is arranged to face the conductor plate 301 (a lower portion of the board 200 in the X-axis negative direction in FIG. 1). The radar device 2000 includes the antenna device 1000 and an IC chip 400. The IC chip 400 functions as a radar transmission/reception circuit that causes the antenna device 1000 to transmit or receive a radar wave.

As depicted in FIG. 2, a conductor pattern 201 is formed on one surface of a dielectric layer 202 of the board 200. The conductor pattern 201 is formed by pattern formation of a conductor foil (a copper foil etc.) by etching or the like. A conductor layer 203 (ground layer) that functions as a ground is formed on the other surface of the dielectric layer 202. Thereby, the board 200 has a configuration including the dielectric layer 202 and the conductor layer 203. The conductor pattern 201, the dielectric layer 202, and the conductor layer 203 form a microstrip line.

The conductor pattern 201 and the conductor layer 203 are electrically connected via vias 204 penetrating the dielectric layer 202. The vias 204 correspond to an example of a connecting section that connects the conductor pattern 201 to the conductor layer 203. Thereby, the conductor pattern 201 is grounded. On both sides of the conductor pattern 201 in a direction orthogonal to the longitudinal direction, multiple first electromagnetic bandgap elements 205 and multiple second electromagnetic bandgap elements 206 are arranged at portions facing the conductor plate 301 (see FIG. 1). As depicted in FIG. 1, the multiple first electromagnetic bandgap elements 205 and the multiple second electromagnetic bandgap elements 206 are arranged such that they are arrayed in multiple rows and multiple columns in the X-axis direction and the Y-axis direction. By arranging a large number of the electromagnetic bandgap elements 205 and 206, it is possible to confine electromagnetic fields and to enhance the performance of the Gap Waveguide.

Figure 6:
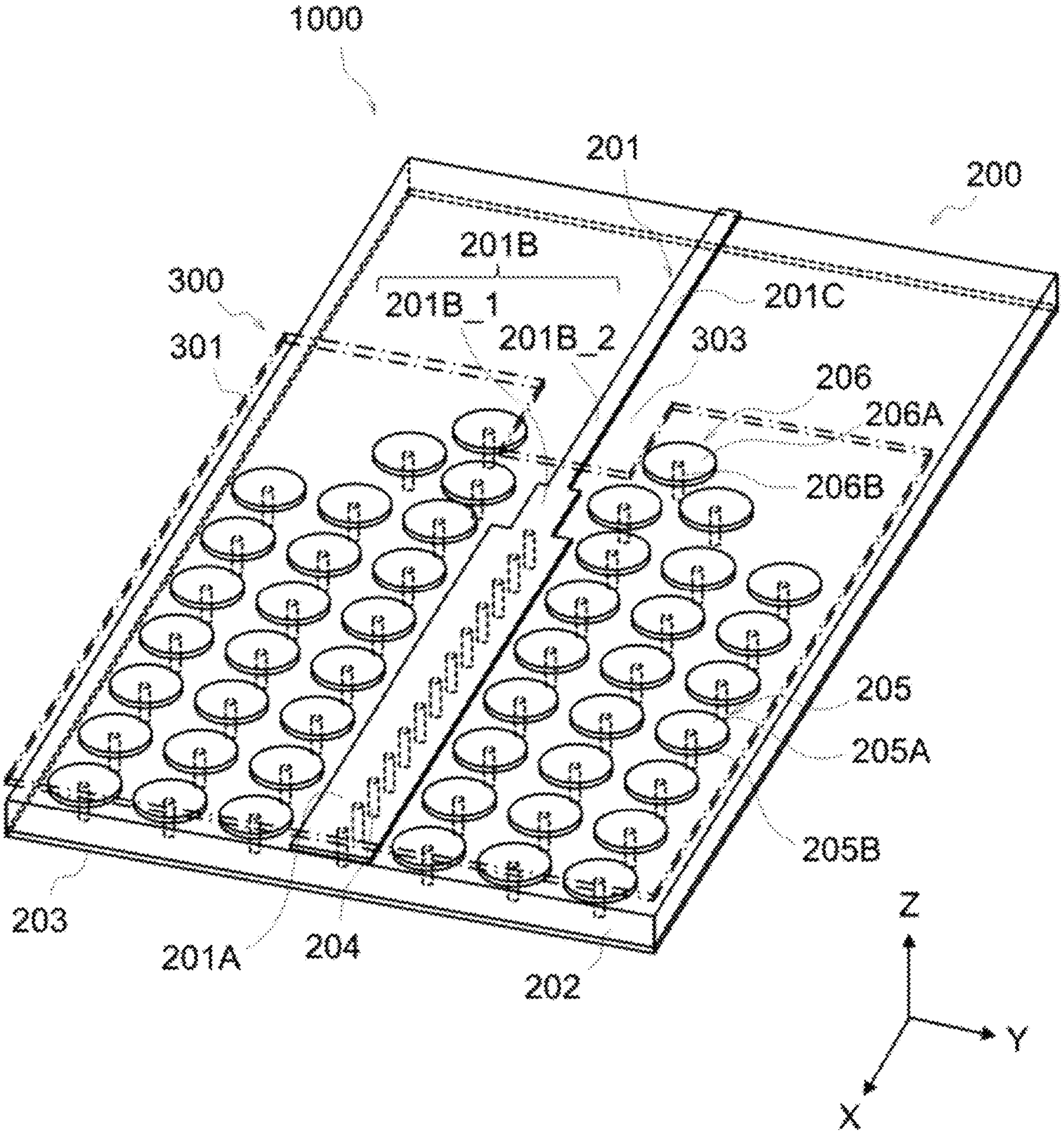
FIG. 6 is a perspective view depicting part of the antenna device in a see-through manner.
Figure 7:
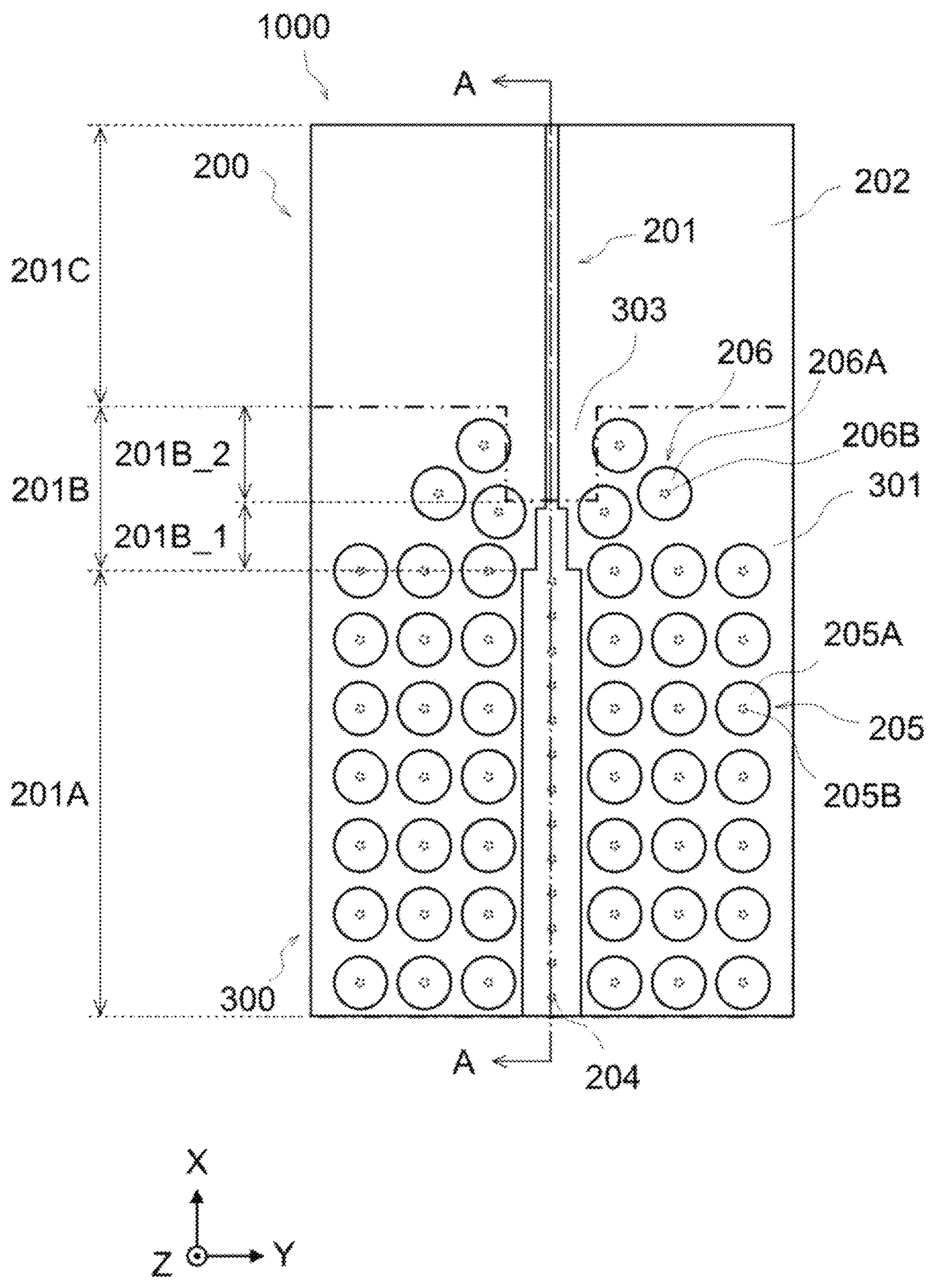
FIG. 7 is a plan view of part of the antenna device.
Figure 8:
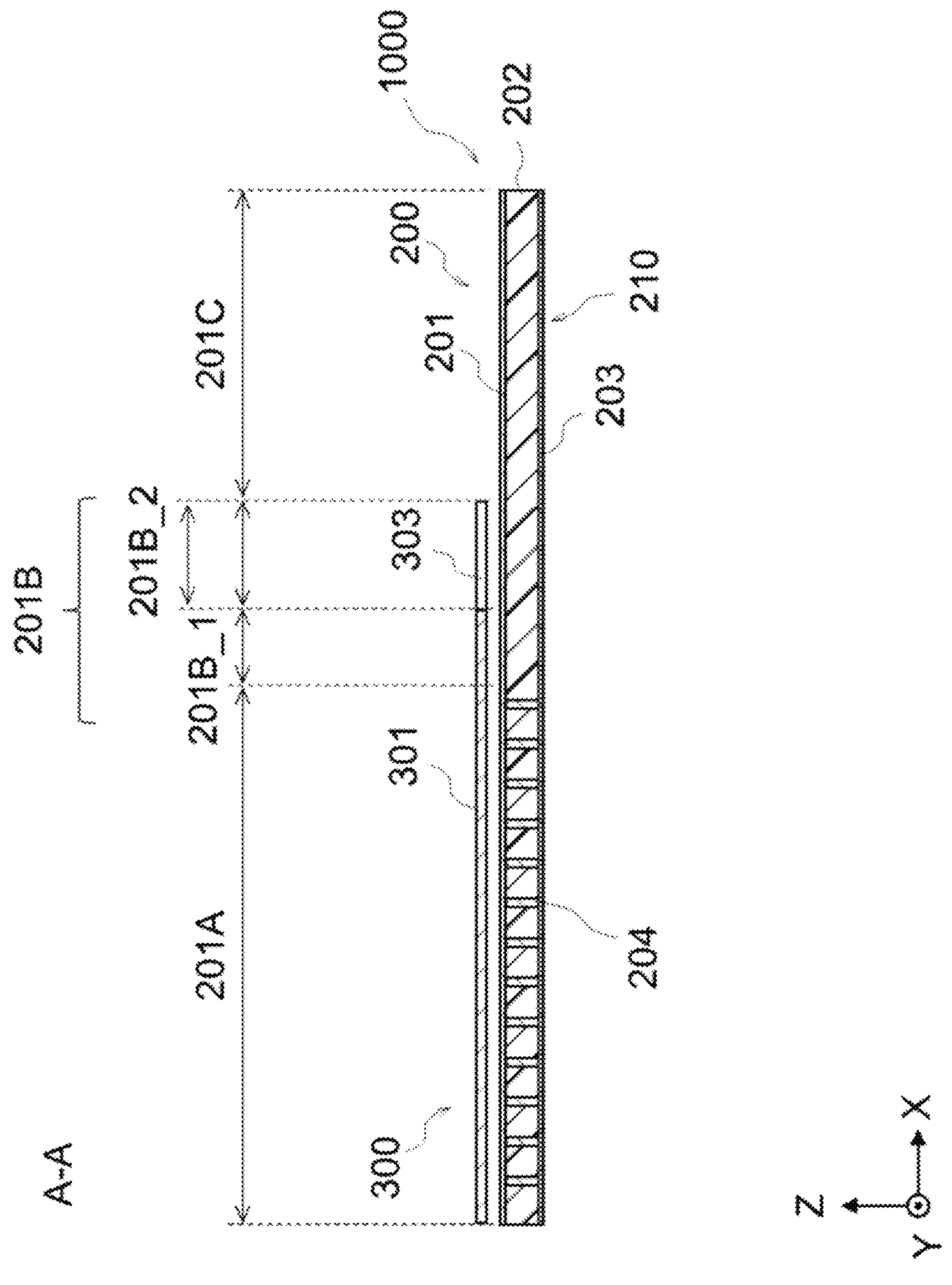
FIG. 8 is a cross-sectional view depicting the structure of a cross section taken along A-A in FIG. 7.

Next, the specific configuration of the antenna device 1000 is explained with reference to FIG. 1 to FIG. 8. FIG. 6 is a perspective view depicting part of the antenna device (the structure of the Gap waveguide, a conversion structure mentioned later, and the microstrip line) in a see-through manner. FIG. 7 is a plan view of the part of the antenna device (the structure of the Gap waveguide, the conversion structure mentioned later, and the microstrip line). FIG. 8 is a cross-sectional view depicting the structure of a cross section taken along A-A in FIG. 7. Note that FIG. 6 to FIG. 8 schematically depict the configuration of each section in order to facilitate understanding of functions of each section.

The conductor pattern 201 arranged on the dielectric layer 202 includes a first conductor pattern 201A, a second conductor pattern 201B, and a third conductor pattern 201C. The first conductor pattern 201A, the second conductor pattern 201B, and the third conductor pattern 201C are formed integrally linearly in this order. Thereby, as depicted in FIG. 7, the first conductor pattern 201A, the second conductor pattern 201B, and the third conductor pattern 201C, as a whole, extend along the X-axis direction on the upper surface (surface) of the dielectric layer 202, and are electrically connected. Whereas the second conductor pattern 201B has a shape with a width that decreases in two stages in the Z-axis direction in FIG. 7, the second conductor pattern 201B can have any of various shapes such as a shape with a width that increases again after decreasing. Note that, the conductor pattern 201 may have a configuration partially curved or partially extending along another direction. For example, the conductor pattern 201 may extend form the IC chip 400 in the Y-axis negative direction, or the conductor pattern 201 may extend from the IC chip 400 in another direction. In the example depicted in FIG. 1, the conductor pattern 201 extends on the side in the Y-axis negative direction from the IC chip 400. An antenna device is provided on the opposite side of the conductor pattern 201 in the Y-axis negative direction, similarly to the antenna device 1000 depicted on the side in the X-axis direction in FIG. 1. Only either one of the antenna devices may be provided, or both the antenna devices may be provided.

As depicted in FIG. 2, the first conductor pattern 201A is arranged on the upper surface of the board 200, and is electrically connected with the conductor layer 203 via the multiple vias 204. In addition, as depicted in FIG. 1, the first conductor pattern 201A is arranged parallel to the upper surface of the board 200 and corresponding to the X-axis direction (first direction). The first direction corresponds to the longitudinal direction of the first conductor pattern 201A. In addition, the first conductor pattern 201A faces the conductor plate 301 (see FIG. 2).

As depicted in FIG. 2, the second conductor pattern 201B is connected to the first conductor pattern 201A, and is arranged on the upper surface of the board 200. Unlike the first conductor pattern 201A, the second conductor pattern 201B is not electrically connected with the conductor layer 203 via the vias 204. As depicted in FIG. 1, the second conductor pattern 201B is arranged parallel to the upper surface of the board 200 and corresponding to the X-axis direction (second direction). The second direction corresponds to the longitudinal direction of the second conductor pattern 201B. In addition, the second conductor pattern 201B is formed such that it has a length which is equal to or greater than approximately ¼ of an operating wavelength (propagation wavelength) in order to sufficiently exhibit functions as the conversion structure mentioned later. Whereas the second direction is the same as or approximately the same as the first direction in the present example, the second direction may be different from the first direction.

The second conductor pattern 201B has a first portion 201B_1 and a second portion 201B_2. The first portion 201B_1 is a portion located on a side closer to the first conductor pattern 201A. The second portion 201B_2 is a portion located on a side closer to the third conductor pattern 201C and opposite to the first portion 201B_1. As depicted in FIG. 2 and FIG. 6, the conductor plate 301 has a shape having a cut (cut 303) at its outer circumferential portion. Thereby, the first portion 201B_1 faces the conductor plate 301, but the second portion 201B_2 does not face the conductor plate 301. Note that the conductor plate 301 may not have a shape having a cut at its outer circumferential portion, but the entire third conductor pattern 201C may face the conductor plate 301.

For impedance matching, the second conductor pattern 201B is formed such that its width is smaller than the width of the first conductor pattern 201A. Thereby, transfer loss can be reduced.

The third conductor pattern 201C is connected to the second conductor pattern 201B and is arranged on the upper surface of the board 200 corresponding to the X-axis direction. Unlike the first conductor pattern 201A, the third conductor pattern 201C is not electrically connected with the conductor layer 203 via the vias 204. In addition, the third conductor pattern 201C does not face the conductor plate 301. Thereby, the third conductor pattern 201C functions as a transfer line 210 (hereinbelow, a line 210) along with the conductor layer 203 and the board (dielectric layer) 202.

Whereas the line 210 is a microstrip line in the present example, it may be another type of line such as a coplanar line. The line 210 includes the third conductor pattern 201C connected to the second conductor pattern 201B of the structure 300.

One end of both ends of the third conductor pattern 201C on a side opposite to the second conductor pattern 201B is connected to a signal terminal of the IC chip 400. The ground terminal of the IC chip 400 is connected to the conductor layer 203 via a via (connecting section) 203_P.

At the time of reception of a radio wave signal, the line 210 receives the radio wave signal propagated by an electric field between the second conductor pattern 201B and the conductor plate 301 and conductor layer 203, and transfers the radio wave signal to the IC chip 400. At the time of transmission of a radio wave signal, the transfer line 210 transfers, to the structure 300, a signal from the IC chip 400 via an electric field formed between the third conductor pattern 201C and the conductor layer 203.

A portion of the conductor layer 203 that faces the first conductor pattern 201A and the second conductor pattern 201B corresponds to the first conductor layer, and a portion (a conductor layer included in the line) of the conductor layer 203 that faces the third conductor pattern 201C corresponds to the second conductor layer. In the example depicted in FIG. 2, the first conductor layer and the second conductor layer are formed integrally on the same layer of the board. In another configuration example, the second conductor layer may be provided inside the dielectric layer 202, and the first conductor layer and the second conductor layer may be electrically connected via vias (see FIG. 28 mentioned later).

For impedance matching, the third conductor pattern 201C is formed such that its width is smaller than the width of the first conductor pattern 201A. Thereby, transfer loss can be reduced. It should be noted that the width of the third conductor pattern 201C may be greater than the width of the first conductor pattern 201A.

For example, the dielectric layer 202 includes a fluorine board, a glass polyimide board, or the like. For the dielectric layer 202, desirably, a material with a low dielectric constant and a low dissipation factor is selected for reducing the transfer loss of a radio wave.

As depicted in FIG. 2, the conductor layer 203 is arranged on the lower surface of the board 200. The conductor layer 203 is formed by pattern formation of a conductor foil (a copper foil etc.) on the other surface of the dielectric layer 202. Note that the conductor layer 203 may be arranged over the entire lower surface of the board 200.

The vias 204 are formed in a columnar shape such that copper or the like which is an electrically conductive material penetrates the dielectric layer 202. For example, the vias 204 are formed by forming via holes which are through holes through the dielectric layer 202 and plating the via holes with copper or the like. The vias 204 electrically connect the first conductor pattern 201A and the conductor layer 203. The multiple vias 204 are provided through the board 200 at predetermined intervals in the X-axis direction. Thereby, the first conductor pattern 201A is electrically connected, in the lengthwise direction thereof, with the conductor layer 203 via the vias 204. Note that, as depicted in FIG. 6 as an example, the multiple vias 204 can be arranged at intervals narrower than intervals at which the first electromagnetic bandgap elements 205 are arranged. Whereas the board 200 according to the embodiment of the present disclosure has a one-layer structure as explained above, the board 200 may be a multilayer board including a conductor layer as an interlayer.

As depicted in FIG. 6, the multiple first electromagnetic bandgap elements (hereinbelow, also referred to as "first EBG elements" simply) 205 are arranged on both sides of the first conductor pattern 201A along the longitudinal direction of the first conductor pattern 201A. Specifically, as depicted in FIG. 7, the first EBG elements 205 are arranged on a first side and a second side of the first conductor pattern 201A in a direction parallel to the board surface and orthogonal to the X-axis direction (first direction). In addition, as depicted in FIG. 1, the first EBG elements 205 are arranged also on the terminating end side (a side opposite to the side connected with the second conductor pattern 201B) of the first conductor pattern 201A.

Each first EBG element 205 has a conductor piece 205A and a via 205B. The conductor piece 205A is provided on a surface of the dielectric layer 202. The via 205B electrically connects the conductor piece 205A and the conductor layer 203. As depicted in FIG. 6, the via 205B is connected with the conductor piece 205A on the upper surface side of the board 200 and is connected with the conductor layer 203 on the lower surface side of the board 200. Thereby, as depicted in the figure, each first EBG element 205 has what is called a mushroom structure with an outline shape that becomes larger at a surface (upper surface) that faces the conductor plate 301.

As depicted in FIG. 6, the multiple second electromagnetic bandgap elements (hereinbelow, also referred to as "second EBG elements" simply) 206 are arranged on both sides of the second conductor pattern 201B along the longitudinal direction of the second conductor pattern 201B. Specifically, as depicted in FIG. 7, the second EBG elements 206 are arranged on a first side and a second side of the second conductor pattern 201B in a direction parallel to the board surface and orthogonal to the X-axis direction (second direction).

Each second EBG element 206 has a conductor piece 206A and a via 206B. The conductor piece 206A is provided on a surface of the dielectric layer 202. The via 206B electrically connects the conductor piece 206A and the conductor layer 203. As depicted in FIG. 6, the via 206B is connected with the conductor piece 206A on the upper surface side of the board 200, and is connected with the conductor layer 203 on the lower surface side of the board 200. Thereby, each second EBG element 206 has a mushroom structure like the one depicted in FIG. 6. Whereas it is assumed that, in the present example, the first EBG elements 205 and the second EBG elements 206 have identical shapes or structures, the first EBG elements 205 and the second EBG elements 206 may have different shapes or different structures.

The structure including the EBG elements 205 and 206 has a resonance frequency based on: the sizes of outline shapes (diameters) of the conductor pieces 205A and 206A; the height (interval) of the gap between the conductor plate 301 and the board 200; the thickness of the board 200; the dielectric constant of the dielectric layer 202; and the like. These elements are correlated, and the sizes of the EBG elements 205 and 206 need to be increased in accordance with a desired resonance frequency, for example, as the operation frequency lowers. As the thickness of the board decreases, the sizes of the conductor pieces 205A and 206A need to be increased. In addition, when the dielectric layer 202 is interposed, the sizes of the conductor pieces 205A and 206A need to be reduced. By setting such elements appropriately, the resonance frequency of the structure including the EBG elements 205 and 206 is set such that the operating band of a radar wave is coped with. For example, the sizes of the conductor pieces 205A and 206A are set such that the resonance frequency copes with the operating band of the radar wave.

As an example, in a case where a signal in the millimeter wave band is transferred, the conductor pieces 205A and 206A can have a configuration having outline shapes with lengths which are equal to or slightly shorter than approximately ¼ of the wavelength. In this case, for example, the EBG elements 205 and 206 are arranged at intervals which are equal to or shorter than approximately ¼ wavelength of the transfer signal. With such a configuration, the EBG elements 205 and 206 can prevent the signal from being leaked and spreading from a path along the conductor pattern 201.

Next, the structure 300 including the gap waveguide is explained. The conductor plate 301 included in the structure 300 is an electrically conductive board material (e.g. an aluminum board or a copper board). The conductor plate 301 is formed into a shape having functions mentioned later by machining, pressing, or etching.

As depicted in FIG. 2, the conductor plate 301 faces the first conductor pattern 201A and the second conductor pattern 201B on the upper surface side of the board 200. Because of this, the conductor plate 301 faces the first conductor pattern 201A and the second conductor pattern 201B in a direction perpendicular to the upper surface of the board 200. In addition, the conductor plate 301 is arranged spaced apart from the board 200 on the upper surface side of the board 200. Because of this, the conductor plate 301 faces the board 200 via an air layer. Stated differently, the structure 300 has a gap of the air layer between the board 200 and the conductor plate 301. Note that the height (width) of the air layer is preferably smaller than ¼ of the propagation wavelength in order to ensure the bandgap characteristics of the gap waveguide.

Slots 302 which are rectangular through holes are formed through the conductor plate 301. The slots 302 function as slot antennas that allow a radio wave to pass therethrough and emit the radio wave. As depicted in FIG. 3 to FIG. 5, the slots 302 are arranged at positions that are offset in the Y-axis direction from the center of the first conductor pattern 201A (the center of the line). The slots 302 are formed for each first conductor pattern 201A (i.e. for each line). Note that, whereas the multiple slots 302 may be formed for each first conductor pattern 201A in the examples depicted in FIG. 3 to FIG. 5, one slot 302 may be formed for each first conductor pattern 201A. In addition, the number of the first conductor patterns 201A is not necessarily greater than one, but may be one. As depicted in FIG. 3, intervals between the adjacent slots 302 in the Z-axis direction are approximately ½ wavelength, as an example. As depicted in FIG. 5, the lengths of the slots 302 in the X-axis direction are approximately ½ wavelength, as an example.

As slot antennas, the slots 302 are used for transmission and reception of a signal transferred by a radar wave. In this case, for example, slots 302 corresponding to first conductor patterns 201A in two columns on one side in four columns depicted in FIG. 1 can be used for transmission, and slots 302 corresponding to first conductor patterns 201A in the remaining two columns can be used for reception. In addition, slots 302 corresponding to all of the four first conductor patterns 201A may be used either for transmission or for reception. In addition, in a case where multiple antenna devices are arranged, each antenna device may be selected as one for transmission or one for reception.

As mentioned above, the conductor plate 301 has, at its outer circumference, the cut 303 at a position overlapping the conductor pattern 201 in the Z-axis direction (see FIG. 6 and FIG. 7). Thereby, the conductor plate 301 has a shape with a cut at its outer circumferential portion facing the second portion 201B_2 of the second conductor pattern 201B. The width of the cut 303 may be greater than the width of the second portion 201B_2. In addition, the cut 303 is provided at a portion not overlapping the EBG elements 206. Stated differently, the EBG elements 206 are positioned on the outer side of the width of the cut 303 when seen in the Z-axis direction.

As depicted in FIG. 1, part of the outer circumference of the conductor plate 301 has a protrusion 304 protruding toward the board 200 by a predetermined length. For example, as depicted in the figure, the protrusion 304 can be provided at a corner of the conductor plate 301. The protrusion 304 is provided with a through hole 304A. The conductor plate 301 is fixed by causing the through hole 304A and a projection 207 provided to the board 200 to fit together and further fastening them by a fastener (not depicted) such as a screw. By aligning and fixing together the projection 207 and the through hole 304A, the conductor plate 301 is aligned with the board 200. Thereby, the slots 302 and the first conductor pattern 201A that are mentioned above are aligned, and the cut 303 and the second portion 201B_2 of the second conductor pattern 201B are aligned.

The protrusion 304 can set the height of the air layer mentioned above depending on its height. Note that, in another possible configuration, instead of the protrusion 304, another member may be interposed between the board 200 and the conductor plate 301.

Next, the IC chip 400 is explained. For example, the IC chip 400 is an integrated circuit such as a system LSI (Large-Scale Integrated circuit) that functions as the radar transmission/reception circuit. Note that the radar transmission/reception circuit may be configured by using not only the IC chip 400, but also a passive element or another semiconductor chip, which are not depicted.

By being connected to the third conductor pattern 201C, the IC chip 400 can input and output a signal via the line 210 including the third conductor pattern 201C. Thereby, the IC chip 400 can transmit and receive a signal (radio wave) via the antenna device 1000. The IC chip 400 outputs a signal of a radar wave via the line 210 according to control of a signal processing circuit, which is not depicted, at the time of signal transmission. Thereby, the radar wave is transmitted from the antenna device 1000. When the antenna device 1000 receives the radar wave reflected by an object (target object), the IC chip 400 receives input of the signal of the radar wave via the line 210.

The radar device 2000 in the embodiment of the present disclosure calculates the propagation time (or frequency change) of a radar wave on the basis of an output signal and an input signal of the IC chip 400. The radar device 2000 calculates the distance from the antenna device 1000 to an object (target object), the speed, and the like on the basis of the propagation time (or frequency change).

Figure 9:
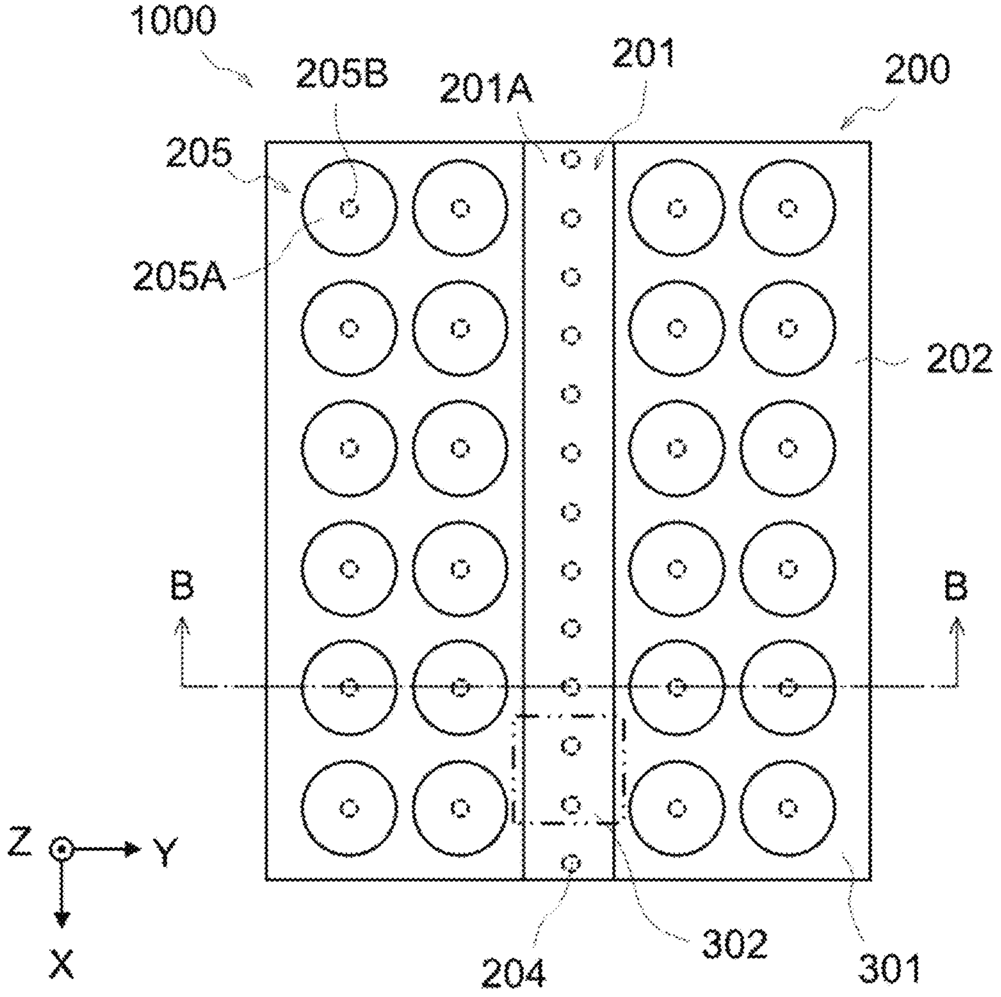
FIG. 9 is a plan view depicting the configuration of the vicinity of a first conductor pattern.
Figure 10:
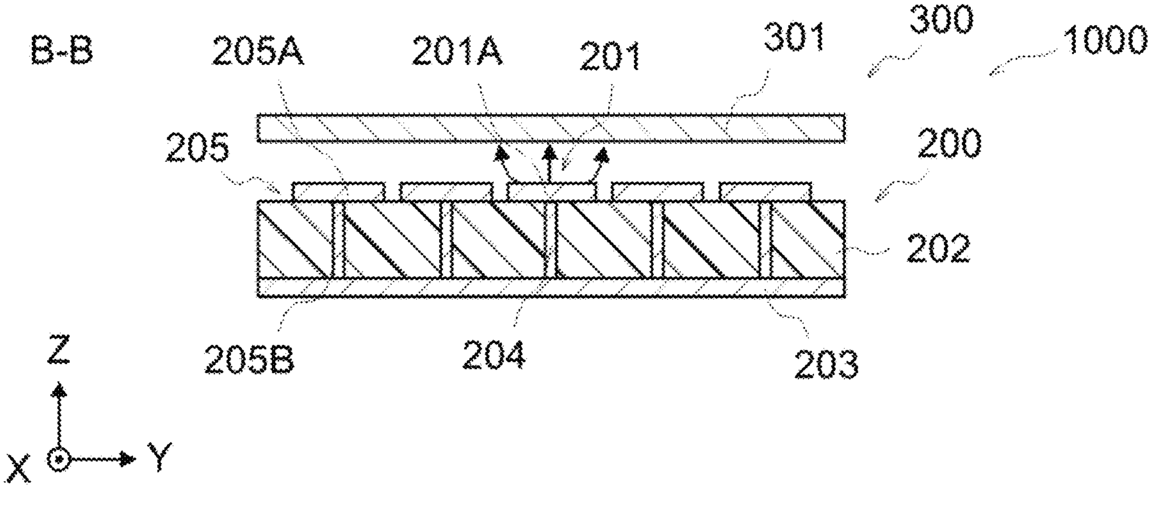
FIG. 10 is a cross-sectional view depicting the structure of a cross section taken along B-B in FIG. 9.

Next, electric fields present in the antenna device 1000 are explained with reference to FIG. 9 to FIG. 17 in order to specifically explain a conversion structure in the antenna device 1000. The configuration of each section is depicted in more detail in FIG. 9 to FIG. 16 in order to facilitate understanding of functions of the section. FIG. 9 is a plan view depicting the configuration of the vicinity of the first conductor pattern. FIG. 10 is a cross-sectional view depicting the structure of a cross section taken along B-B in FIG. 9. As depicted in FIG. 10, the first conductor pattern 201A is connected via the vias 204 to the conductor layer 203 that functions as a ground. Because of this, an electric field is not generated in the conductor layer 203, but is generated in the air layer between the first conductor pattern 201A and the conductor plate 301 as represented by arrows in the figure. In addition, since the first conductor pattern 201A has a configuration surrounded by the first EBG elements 205 on both sides in the Y-axis direction, it is possible to confine the electric field between the board 200 and the conductor plate 301 and prevent the electric field from being leaked and spreading sideways.

Figure 11:
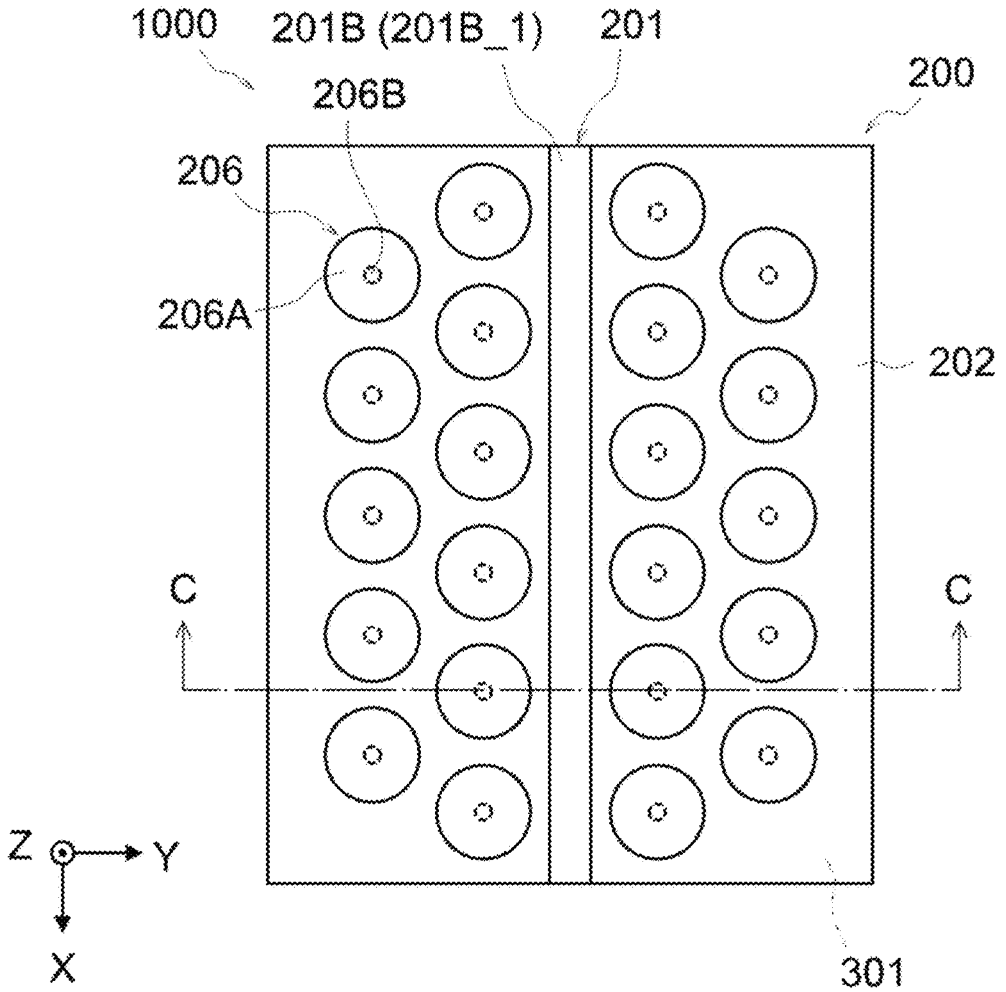
FIG. 11 is a plan view depicting the configuration of a second conductor pattern on a side closer to the first conductor pattern.
Figure 12:
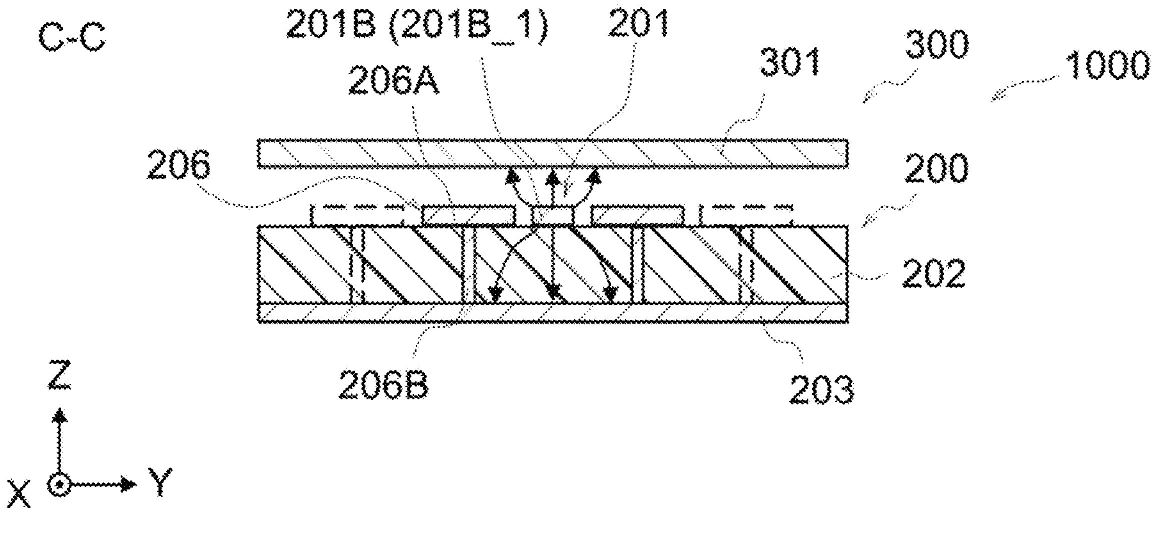
FIG. 12 is a cross-sectional view depicting the structure of a cross section taken along C-C in FIG. 11.

FIG. 11 is a plan view depicting the configuration of the second conductor pattern on a side closer to the first conductor pattern (particularly, the first portion 201B_1 directly above which there is the conductor plate 301). FIG. 12 is a cross-sectional view depicting the structure of a cross section taken along C-C in FIG. 11. As depicted in FIG. 12, unlike the first conductor pattern 201A, the second conductor pattern 201B does not have a structure connected to the conductor layer 203 via vias. Because of this, electric fields are generated both between the second conductor pattern 201B and the conductor plate 301 (the air layer), and between the second conductor pattern 201B and part of the conductor layer 203 that faces the second conductor pattern 201B (the dielectric layer 202). In addition, respective second EGB elements 206 included in columns on both sides in columns of the EBG elements 206 along the X-axis direction that are close to the second conductor pattern 201B are arranged at appropriate distances from each other that are shorter than ¼ wavelength. Thereby, it is possible to prevent electric fields from spreading in the Y-axis direction.

Note that, for impedance matching, the width of the second conductor pattern 201B is made smaller than the width of the first conductor pattern 201A. The width of the second conductor pattern 201B may be reduced stepwise toward the direction of the IC 400 chip. For example, the width of the second conductor pattern 201B may be reduced gradually starting from the width of the first conductor pattern 201A.

Figure 13:
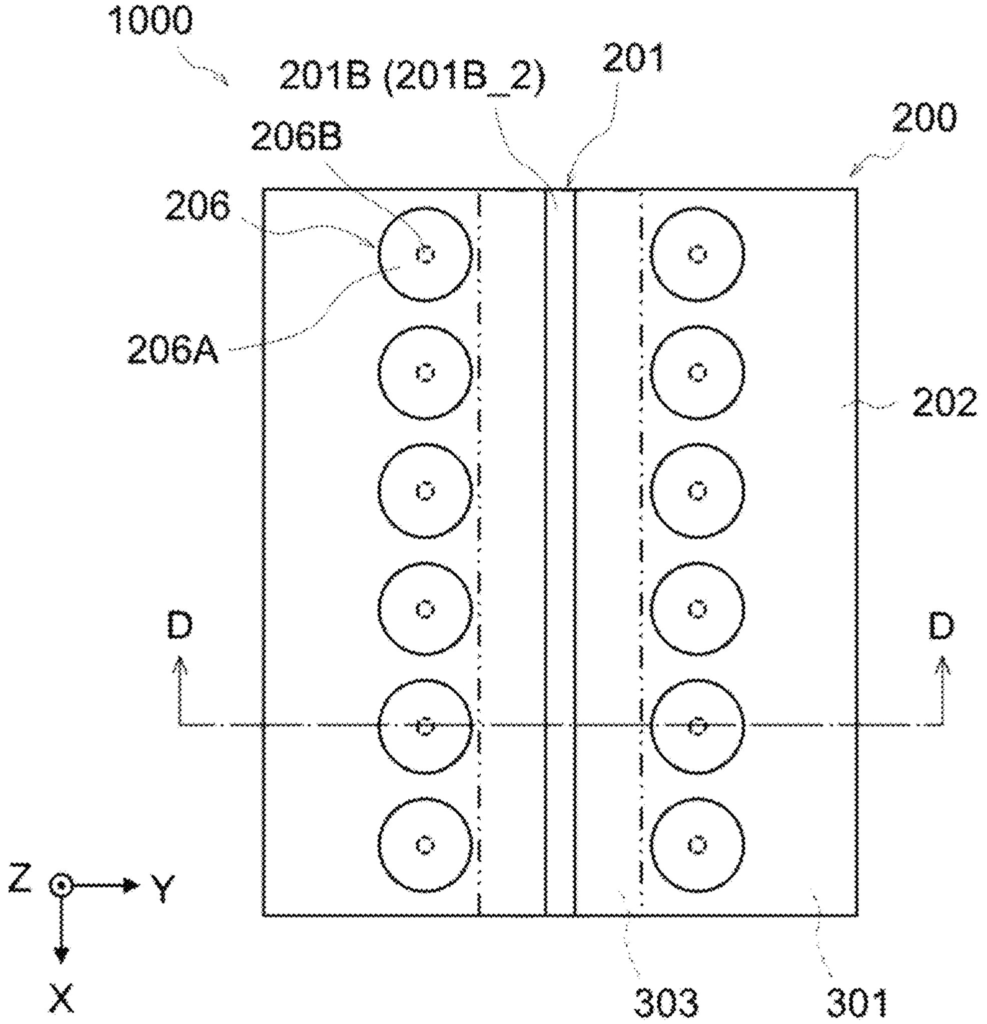
FIG. 13 is a plan view depicting the configuration of the second conductor pattern on a side closer to a third conductor pattern.
Figure 14:
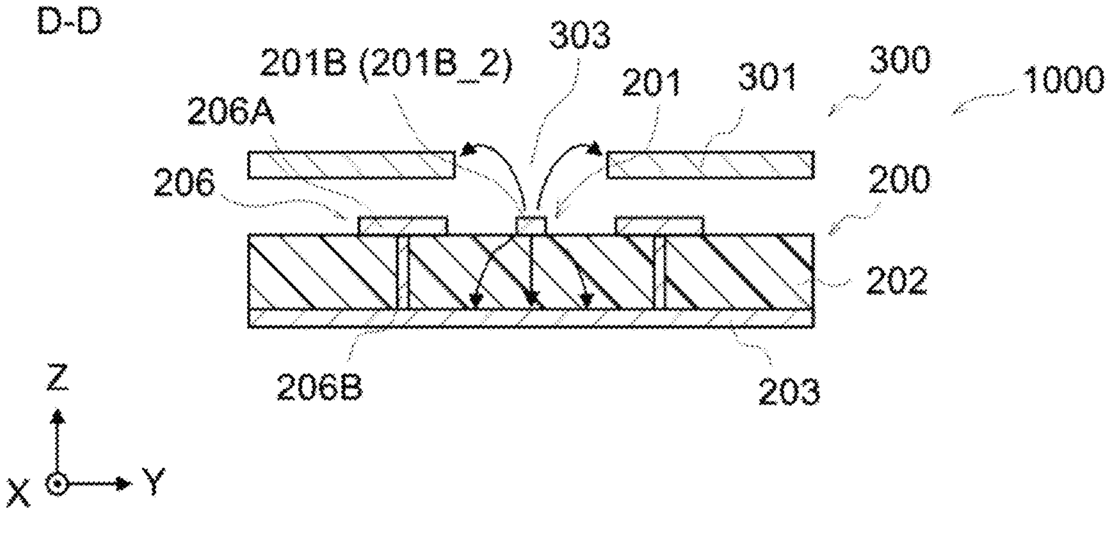
FIG. 14 is a cross-sectional view depicting the structure of a cross section taken along D-D in FIG. 13.

FIG. 13 is a plan view depicting the configuration of the second conductor pattern on a side closer to the third conductor pattern (particularly, the second portion 201B_2 directly above which there is not the conductor plate 301). FIG. 14 is a cross-sectional view depicting the structure of a cross section taken along D-D in FIG. 13. As depicted in FIG. 14, in the second conductor pattern 201B (the second portion 201B_2 directly above which there is not the conductor plate 301), an electric field is generated between an edge portion of the conductor plate 301 that contacts the cut 303 and the second conductor pattern 201B. Since there is not the conductor plate 301 directly above the second portion 201B_2 due to the cut of the conductor plate 301 above the second portion 201B_2, the distance between the second portion 201B_2 and the conductor plate 301 becomes longer. Accordingly, it can be made easier for an electric field to be generated on the side of the dielectric layer 202, and an electric field generated along the conductor pattern 201 can be converted more efficiently. The EBG elements 206 may be apart from the second conductor pattern 201B by an amount corresponding to the cut 303 of the conductor plate 301.

Figure 15:
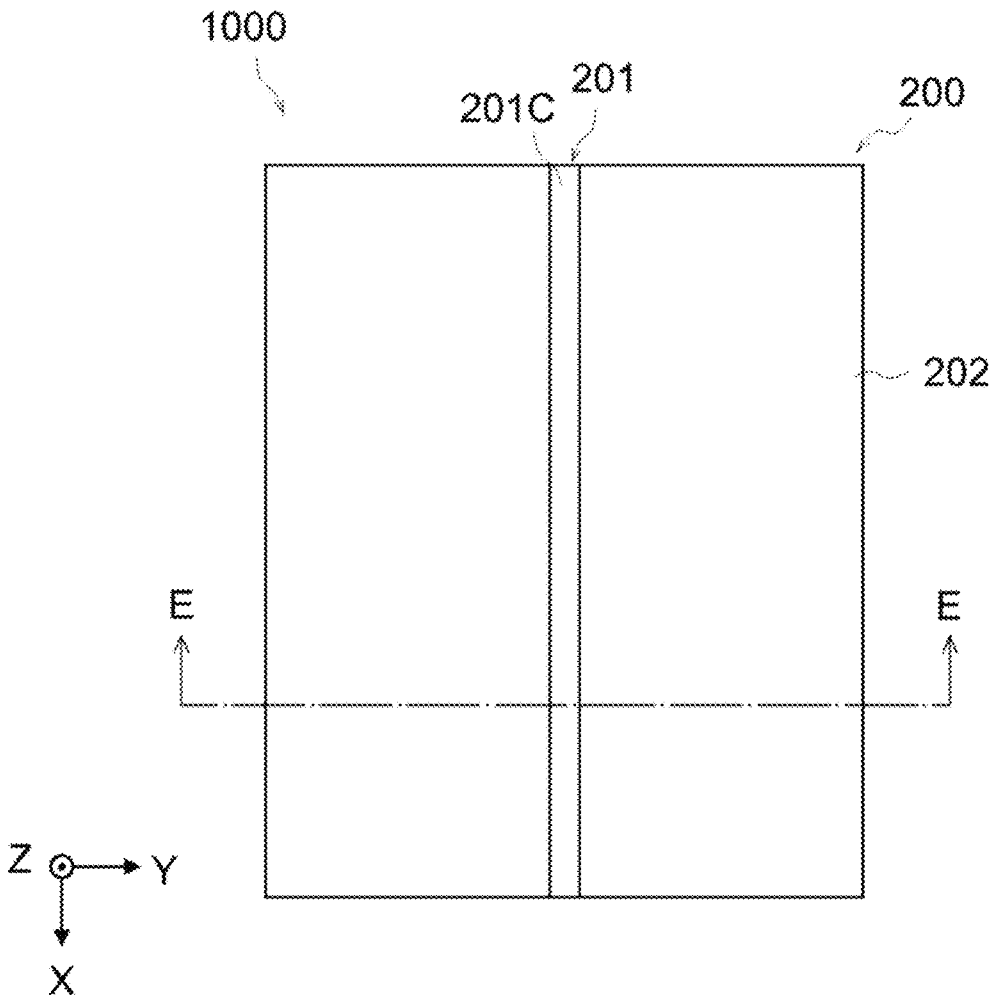
FIG. 15 is a plan view depicting the configuration of the vicinity of the third conductor pattern.
Figure 16:
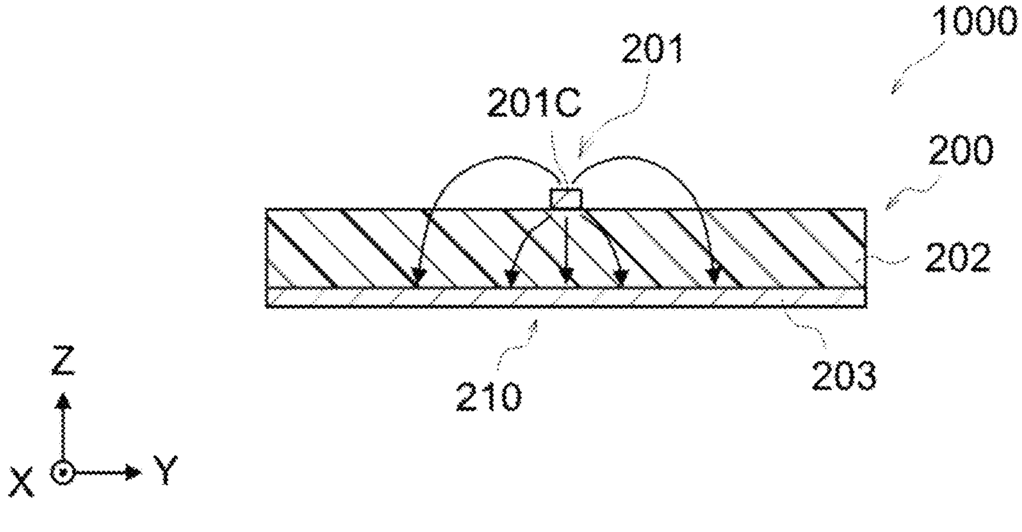
FIG. 16 is a cross-sectional view depicting the structure of a cross section taken along E-E in FIG. 15.

FIG. 15 is a plan view depicting the configuration of the vicinity of the third conductor pattern. FIG. 16 is a cross-sectional view depicting the structure of a cross section taken along E-E in FIG. 15. As depicted in FIG. 16, the third conductor pattern 201C is included in a microstrip line 210 along with the dielectric layer 202 and the conductor layer 203. An electric field is generated mainly between the third conductor pattern 201C and part of the conductor layer 203 that faces the third conductor pattern 201C.

As explained above, as major configurations, the structure 300 includes the first conductor pattern 201A, the second conductor pattern 201B, the third conductor pattern 201C, the multiple first EBG elements 205, the multiple second EBG elements 206, and the conductor plate 301 having the slots 302. Thereby, the first conductor pattern 201A connected to the conductor layer 203 via the vias 204 has a configuration sandwiched by the first EBG elements 205 on both sides of the board 200 in the Y-axis direction. In addition, the first conductor pattern 201A has a configuration covered with the conductor plate 301 with the air layer interposed therebetween. Thereby, the configuration functions as the gap waveguide that propagates a signal through the air layer on the first conductor pattern 201A. In particular, the gap waveguide in the embodiment of the present disclosure functions as what is called an MRGW since it is formed on the board 200. Since a propagated signal is propagated mainly through the air layer of the space between the conductor plate 301 and the board 200 in the MRGW in the embodiment of the present disclosure, the influence of loss of the board can also be made smaller than that in the microstrip line.

The second conductor pattern 201B connected to the first conductor pattern 201A has a configuration which is not connected to the conductor layer 203 via the vias 204 and is sandwiched by the second EBG elements 206 on both sides of the board 200 in the Y-axis direction. Specifically, the second conductor pattern 201B is sandwiched by EGBs arranged at a distance shorter than ¼ wavelength on both sides in the Y-axis direction. Thereby, the configuration functions as a conversion structure that propagates a signal by an electric field formed in the dielectric layer 202 of the board 200 around the second conductor pattern 201B. In addition, the second conductor pattern 201B including the second portion 201B_2 directly above which there is not the conductor plate 301 enables more efficient conversion of an electric field.

Then, since the third conductor pattern 201C connected to the second conductor pattern 201B has a configuration which is not connected to the conductor layer 203 via the vias 204 and is not sandwiched by the EBG elements, the third conductor pattern 201C functions as the typical line 210, more specifically as the microstrip line, along with the conductor layer 203.

Figure 17:
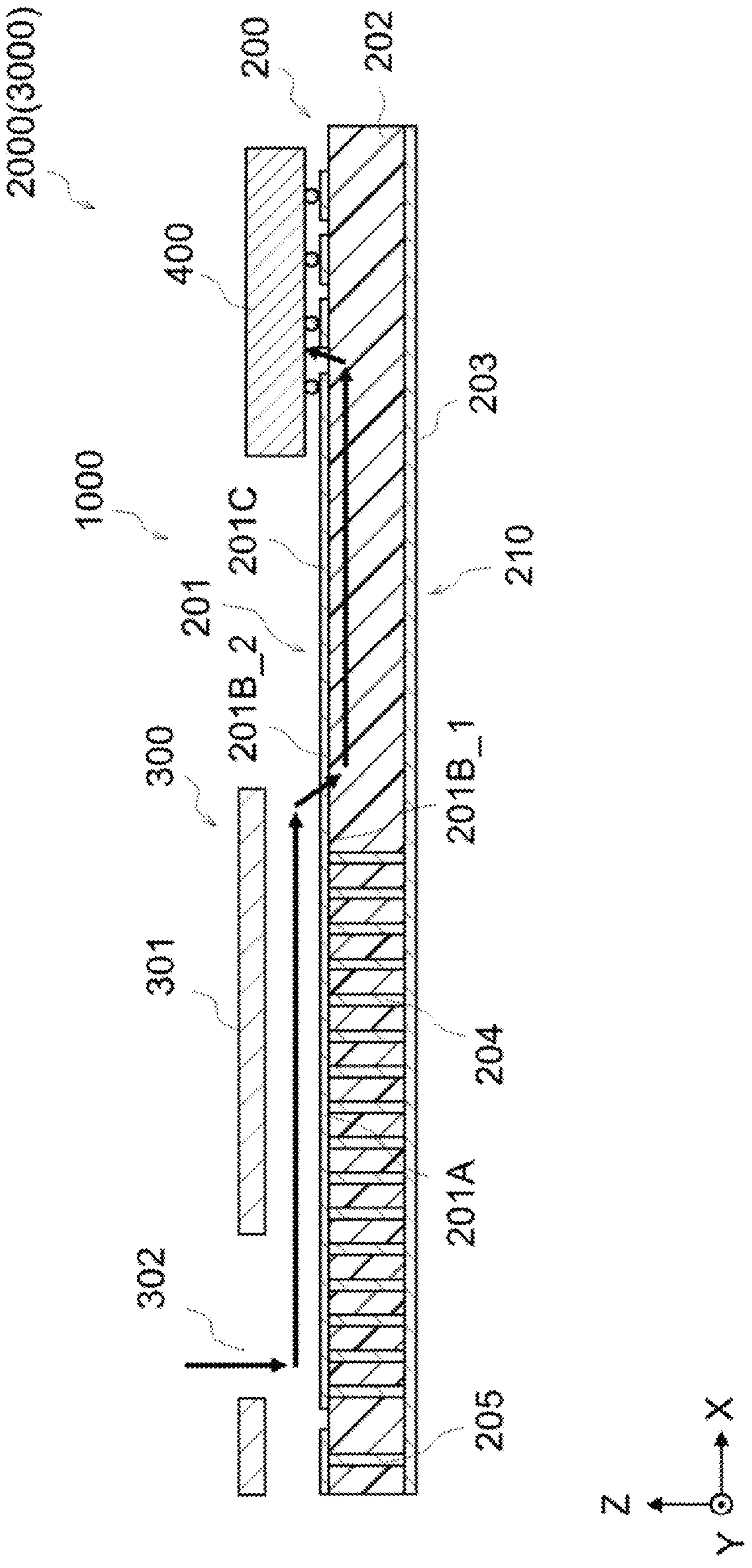
FIG. 17 is a schematic cross-sectional view of the radar device depicting a radio wave propagation path.

In such a manner, the antenna device 1000 including the conversion structure connecting the gap waveguide and the line 210 can be realized using the conductor pattern 201. FIG. 17 is a schematic cross-sectional view of the radar device including the antenna device 1000 depicting a radio wave propagation path. A signal is transferred by propagation of a radio wave as represented by thick arrows in the figure. Specifically, a radio wave (e.g. a radar wave) propagated and received inside the structure 300 via the slots 302 of the conductor plate 301 is propagated through the air layer between the conductor plate 301 and the first conductor pattern 201A, and thereafter is propagated, at the second conductor pattern 201B, also through the dielectric layer 202 thereunder. Then, the received radio wave is propagated through the dielectric layer 202 along the line 210, and is input to the IC chip 400 that functions as a radar reception circuit.

In such a manner, in the antenna device 1000, first, the received radio wave signal is transferred by an electric field (first electric field) formed between the first conductor pattern 201A arranged on the board 200 including the conductor layer 203 and the conductor plate 301 facing the board 200. After the signal is transferred by the first electric field, the signal is transferred by an electric field (second electric field) formed between each of the conductor plate 301 and conductor layer 203 and the second conductor pattern 201B that is connected to the first conductor pattern 201A and has a length which is equal to or greater than approximately ¼ of the operating wavelength. After the signal is transferred by the second electric field, the signal is transferred by an electric field (third electric field) formed between the conductor layer 203 and the third conductor pattern 201C electrically connected to the second conductor pattern 201B on a side opposite to the first conductor pattern 201A.

On the other hand, when the IC chip 400 functions as a radar transmission circuit and transmits a transfer signal, the transfer signal is transferred by propagation of a radio wave in a direction opposite to the direction represented by the thick arrows in FIG. 17. Specifically, the radio wave is propagated through the dielectric layer 202 along the line 210, and is propagated, at the second conductor pattern 201B, also through the air layer between the conductor plate 301 and the first conductor pattern 201A. Then, the radio wave is propagated through the air layer between the conductor plate 301 and the first conductor pattern 201A at the first conductor pattern 201A, and is emitted (sent out) from the structure 300 via the slots 302.

As explained above, according to the technology of the present disclosure, by appropriately combining the arrangement of the vias 204, the EBG elements 205 and 206, and the conductor plate 301 according to the three functions of the conductor pattern 201, both propagation and conversion of radio waves can be realized by generating electric fields along the conductor pattern 201.

Figure 18:
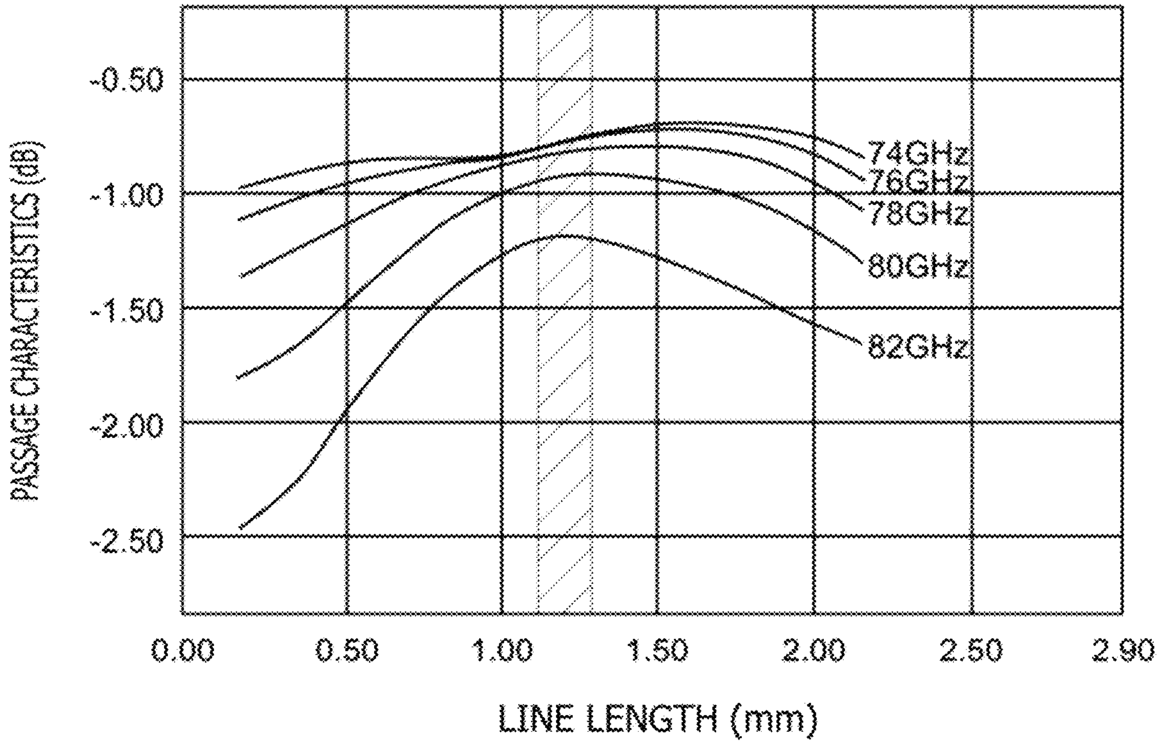
FIG. 18 is a view depicting results of passage characteristics simulation.

Next, results of passage characteristics simulation of the structure 300 according to the embodiment of the present disclosure are explained with reference to FIG. 18. FIG. 18 is a view depicting results of passage characteristics simulation. The simulation results depicted in the figure are results obtained by using existing simulation software that enables analysis of electromagnetic fields on the basis of parameters related to the model of the structure 300 and the frequency of a transfer signal. Specifically, the simulation results depicted in FIG. 18 could be obtained under conditions in which the length of the cut 303 of the conductor plate 301 in the structure 300 depicted in FIG. 7 (stated differently, the line length of the second portion 201B_2 in the second conductor pattern 201B) is 0.15 to 2.15 mm, the effective dielectric constant is equal to or lower than 2.5, and the frequency of the transfer signal is 74 to 82 GHZ. Note that such frequencies are equivalent to frequencies in the millimeter wave band that are used for vehicle-mounted radars.

According to the simulation results of the passage characteristics (S(2,1)) of the structure 300 according to the embodiment of the present disclosure under the conditions described above, loss of the structure 300 according to the embodiment of the present disclosure is small in a case where the line length of the second portion 201B_2 is 1.1 to 1.3 mm (the hatched portion in FIG. 18). That is, it could be confirmed that the passage characteristics were favorable. These line lengths are equivalent to approximately ½ wavelength near the frequencies of 74 to 82 GHZ.

Note that, as depicted in FIG. 18, the line length that gives the smallest loss differs by frequency. Because of this, by adjusting the line length of the second portion 201B_2 in the second conductor pattern 201B depending on the frequency of a transfer signal, loss of the transfer signal can be reduced, and the antenna characteristics of the structure 300 can be made favorable.

2. MODIFICATION EXAMPLE

Next, an overview of the antenna device 1000 and the radar device 2000 in the embodiment of the present disclosure is explained with reference to FIG. 19 to FIG. 27.

Figure 19:
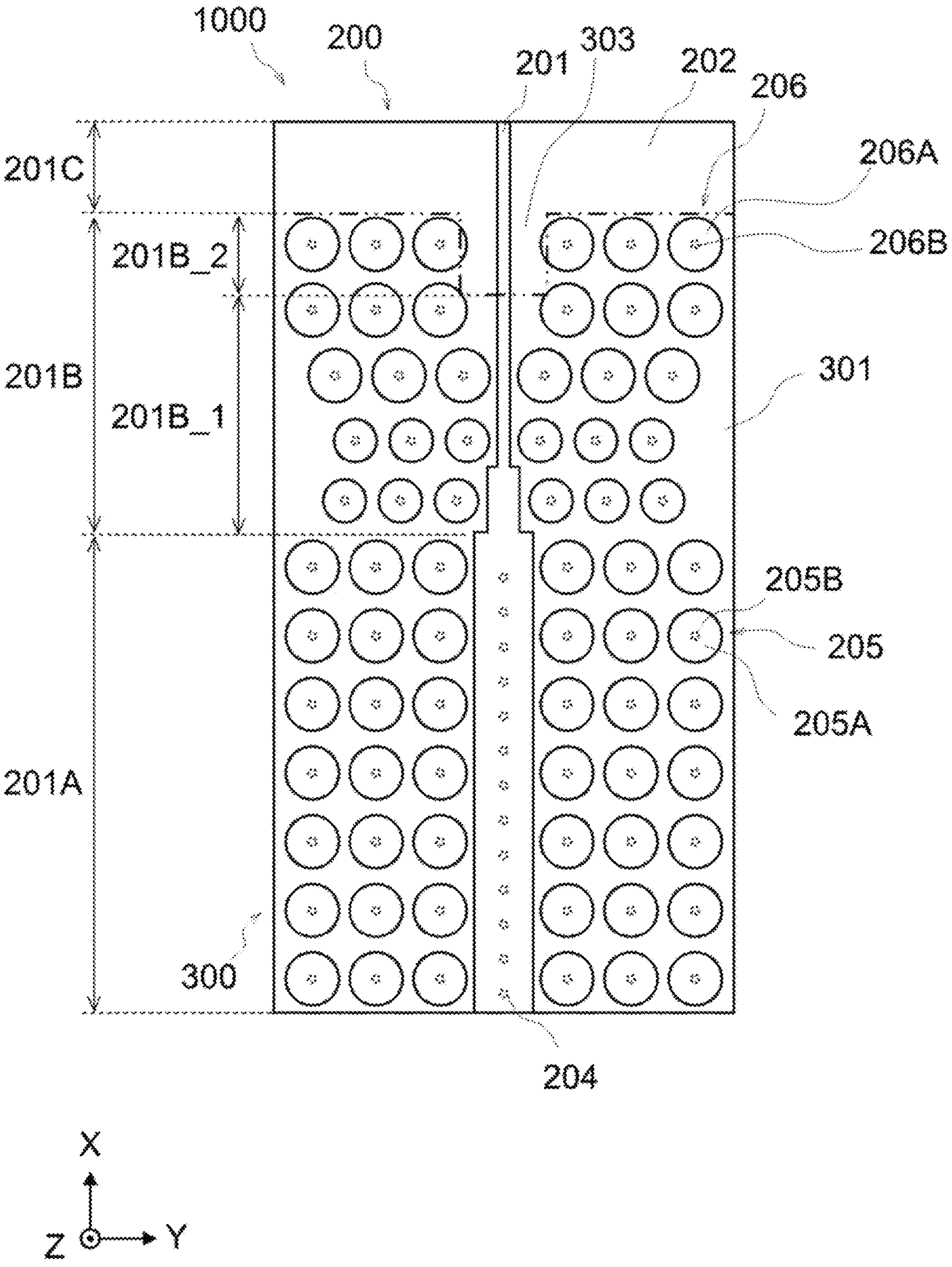
FIG. 19 is a plan view depicting an example of the antenna device according to a first modification example.

FIG. 19 is a plan view depicting an example of a structure for conversion from the microstrip line to the MRGW of the antenna device according to a first modification example. Whereas the length of the first portion 201B_1 of the second conductor pattern 201B is shorter than the second portion 201B_2 in the embodiment mentioned above, the length of the first portion 201B_1 is made longer than the second portion 201B_2 in the first modification example depicted in FIG. 19. In addition, the second EBG elements 206 are made smaller than the first EBG elements 205, and are arranged densely.

Figure 20:
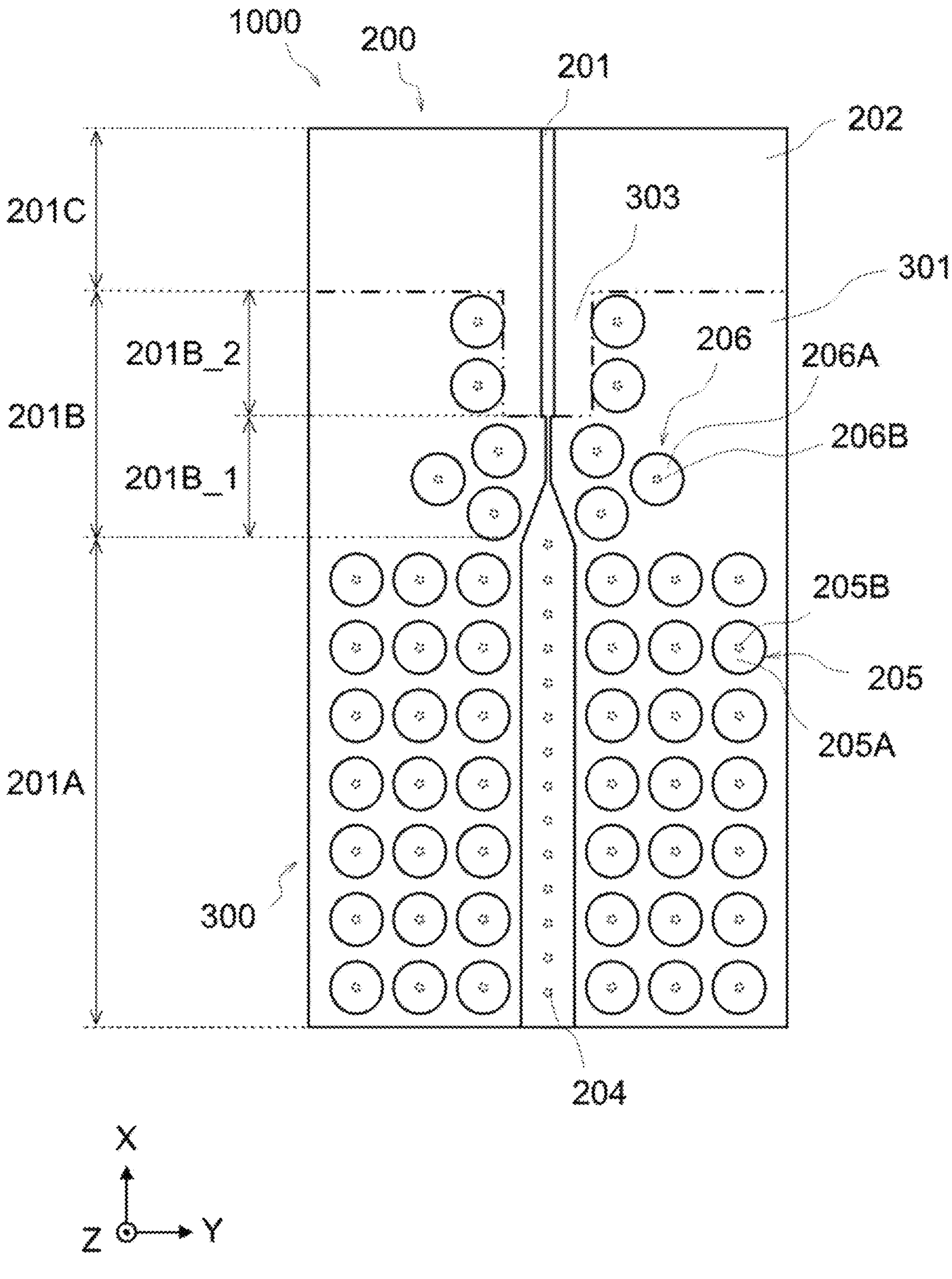
FIG. 20 is a plan view depicting an example of the antenna device according to a second modification example.

FIG. 20 is a plan view depicting an example of a structure for conversion from the microstrip line to the MRGW of the antenna device according to a second modification example. Whereas the width of the conductor pattern 201 decreases stepwise from the first conductor pattern 201A to the third conductor pattern 201C in the embodiment mentioned above, the width of the second conductor pattern 201B decreases continuously in a direction from the first conductor pattern 201A to the third conductor pattern 201C in the second modification example depicted in FIG. 20. In this case, the second conductor pattern 201B is tapered in the direction to the third conductor pattern 201C. Thereby, occurrence of dimensional errors can be reduced when the conductor pattern 201 is formed by etching, and the conductor pattern 201 with matching impedance can be formed stably. Note that, by tapering, toward the first conductor pattern 201A, part of the second conductor pattern 201B that is located on a side closer to the first conductor pattern 201A as depicted in the figure, the width of the second conductor pattern 201B can be reduced toward the first conductor pattern 201A, in one possible configuration.

Note that, for impedance matching, the width of the first portion 201B_1 may be the smallest part of widths of the conductor pattern 201, in another possible configuration.

Figure 21:
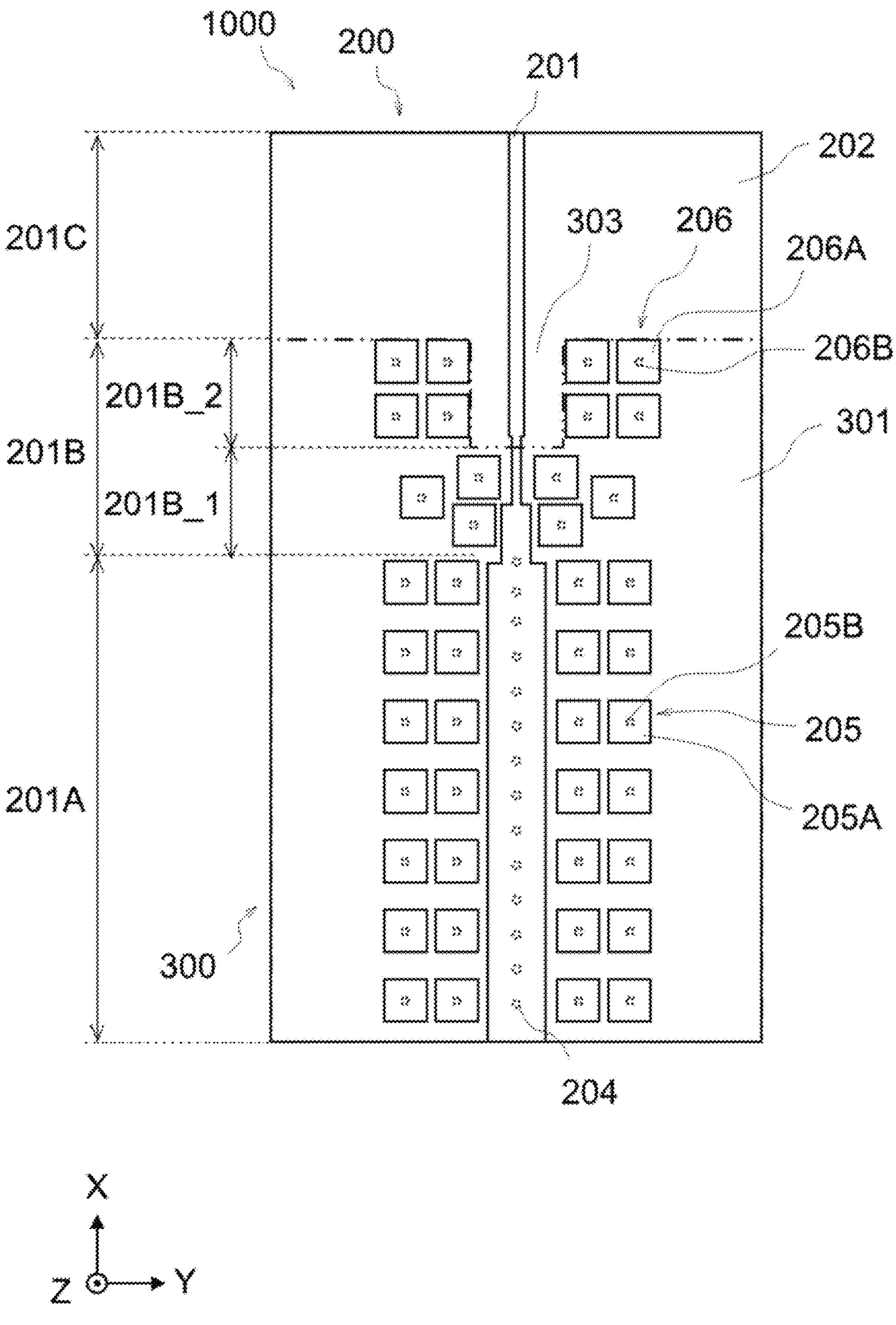
FIG. 21 is a plan view depicting an example of the antenna device according to a third modification example.

FIG. 21 is a plan view depicting an example of a portion including a structure for conversion from the microstrip line to the MRGW of the antenna device according to a third modification example. Whereas the conductor pieces 205A and 206A of the EBG elements 205 and 206 have outline shapes that are circular in the Z-axis direction in the embodiment mentioned above, the conductor pieces 205A and 206A may have outline shapes that are rectangular in the Z-axis direction. In addition, the outline shapes of the conductor pieces 205A and 206A may be polygons other than quadrangles.

Figure 22:
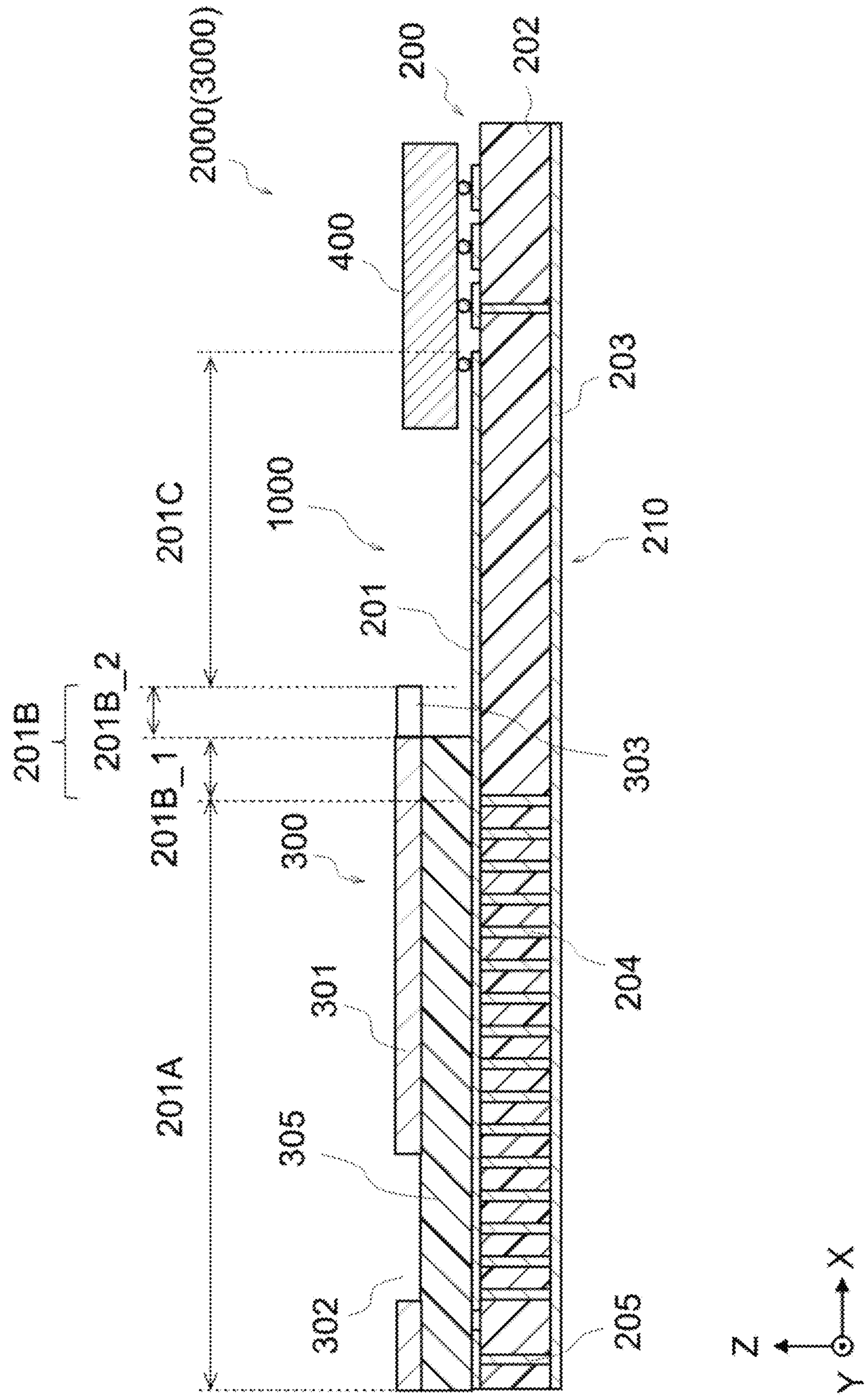
FIG. 22 is a cross-sectional view depicting an example of the antenna device according to a fourth modification example.

FIG. 22 is a cross-sectional view depicting an example of the portion including the structure for conversion from the microstrip line to the MRGW of the antenna device according to a fourth modification example. Whereas there is the air layer between the board 200 and the conductor plate 301 in the configuration example explained in the embodiment mentioned above, there is a dielectric layer 305 between the board 200 and the conductor plate 301 in the fourth modification example depicted in FIG. 22. In this case, for the dielectric layer 305, a low-loss dielectric like a cellular porous medium may be used to reduce transfer loss of a radio wave similarly to the dielectric layer 202. Note that the height of the gap between the board 200 and the conductor plate 301 can also be adjusted by the thickness of the dielectric layer 305. In this case, the protrusion 304 of the conductor plate 301 may be omitted, in one possible configuration (see FIG. 1). In addition, the dielectric layer 305 may bond the board 200 and the conductor plate 301, in another possible configuration.

Figure 23:
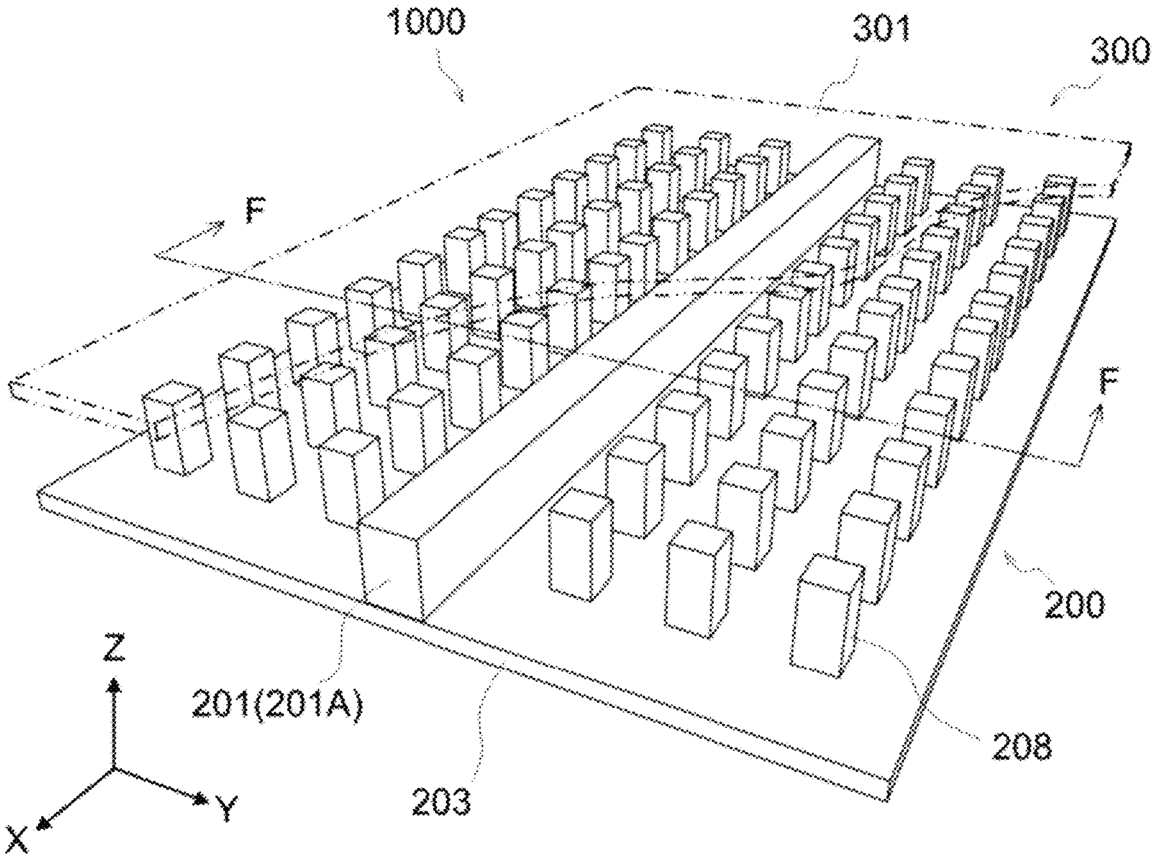
FIG. 23 is a perspective view depicting an example of the antenna device according to a fifth modification example in a see-through manner.
Figure 24:
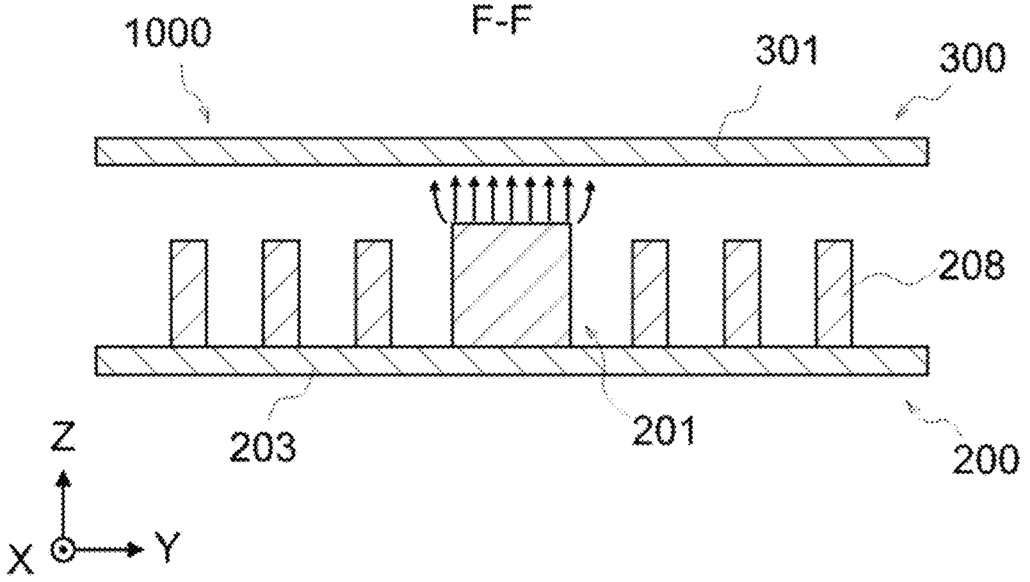
FIG. 24 is a cross-sectional view depicting the structure of a cross section taken along F-F in FIG. 23.

FIG. 23 is a perspective view depicting an example of the MRGW structure according to a fifth modification example in a see-through manner. FIG. 24 is a cross-sectional view depicting the structure of a cross section taken along F-F in FIG. 23. Whereas the board 200 including the dielectric layer 202 is used in the configuration example explained in the embodiment mentioned above, the board 200 not including the dielectric layer 202 is used in the fifth modification example depicted in FIG. 23 and FIG. 24. For example, the board 200 is formed by machining an aluminum board.

The conductor pattern 201 is formed on the conductor layer 203 of the board 200 in the X-axis direction. The conductor plate 301 is provided above the board 200 (in the Z-axis positive direction). A contact surface (contact section) of the conductor pattern 201 at which it contacts the conductor layer 203 corresponds to an example of an electrically conductive connecting section connecting the conductor pattern 201 to the conductor layer 203. A space (air layer) is formed between the conductor pattern 201 and the conductor plate 301. In addition, multiple rectangular columnar EBG elements 208 are formed on the conductor layer 203. These configurations function as a ridge gap waveguide.

Whereas FIG. 23 depicts only a portion related to the first conductor pattern 201A, a portion related to the second conductor pattern and a portion related to the third conductor pattern can be formed similarly. For example, the second conductor pattern extending in the X-axis negative direction is formed such that it is connected only to part of the conductor pattern 201 in the Z-axis direction in FIG. 23 (only to a top section of the conductor pattern 201 along the Z-axis direction), and a space is formed between the second conductor pattern and each of the conductor plate 301 and the board 200. Thereby, it is made possible to form an electric field between the second conductor pattern and each of the board 200 and the conductor plate 301.

The third conductor pattern is provided such that it extends from the second conductor pattern, and a space can be formed between the third conductor pattern and the conductor plate 301, and it is made possible to form an electric field between the third conductor pattern and the conductor plate 301. The third conductor pattern is connected with the signal terminal of the IC chip directly or via a wire or the like. In addition, the ground terminal of the IC chip and the board 200 are electrically connected by a wire or the like.

In this ridge gap waveguide, an electric field is generated in the space between the conductor pattern 201 and the conductor plate 301 as depicted in FIG. 24. In this case, the EBG elements 208 prevent side leakage of the electric field. Note that the height (thickness) of the conductor pattern 201 on the conductor layer 203 may be zero.

Figure 25:
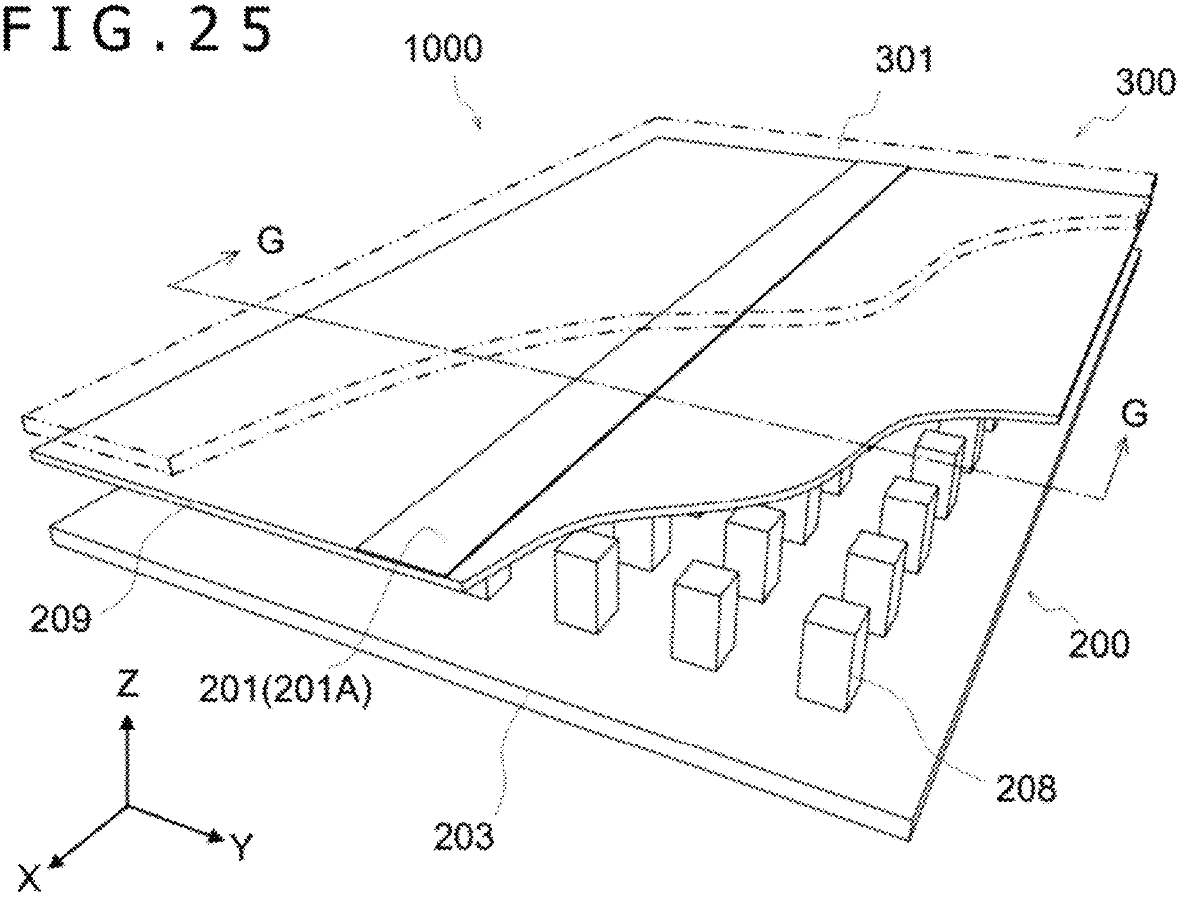
FIG. 25 is a perspective view depicting an example of the antenna device according to a sixth modification example in a see-through manner.
Figure 26:
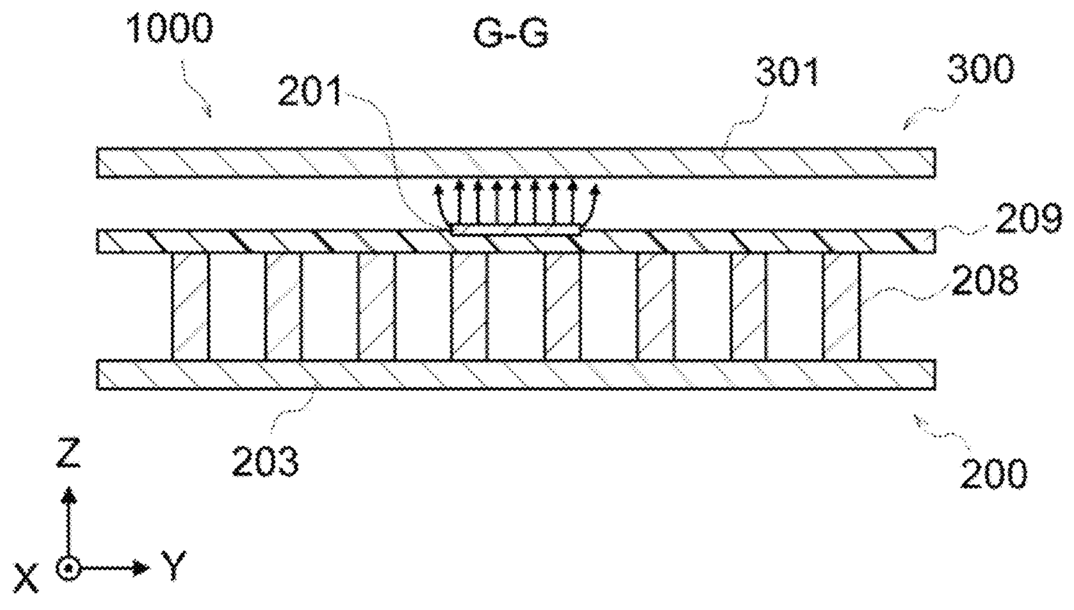
FIG. 26 is a cross-sectional view depicting the structure of a cross section taken along G-G in FIG. 25.

FIG. 25 is a perspective view depicting an example of the antenna device according to a sixth modification example in a see-through manner. FIG. 26 is a cross-sectional view depicting the structure of a cross section taken along G-G in FIG. 25. The sixth modification example depicted in FIG. 25 and FIG. 26 includes the board 200 on which the multiple rectangular columnar EBG elements 208 are provided, a board 209 (e.g. a dielectric board) on which the conductor pattern 201 is arranged, and the conductor plate 301. The figure depicts a portion related to the first conductor pattern 201A, and portions related to the second conductor pattern and the third conductor pattern are omitted. The dielectric layer 202 is not included in the board 200. These configurations function as an inverted microstrip gap waveguide. The conductor pattern 201 is connected to the second conductor pattern outside the figure in the X-axis negative direction, and the second conductor pattern can form an electric field between the conductor plate 301 and the conductor layer 203. Furthermore, the second conductor pattern is connected with a line including the third conductor pattern outside the figure.

In this inverted microstrip gap waveguide, an electric field is generated in the air layer between the conductor pattern 201 on the board 209 and the conductor plate 301. Note that the conductor pattern 201 can also be connected with the conductor layer 203 at a portion which is not depicted.

Figure 27:
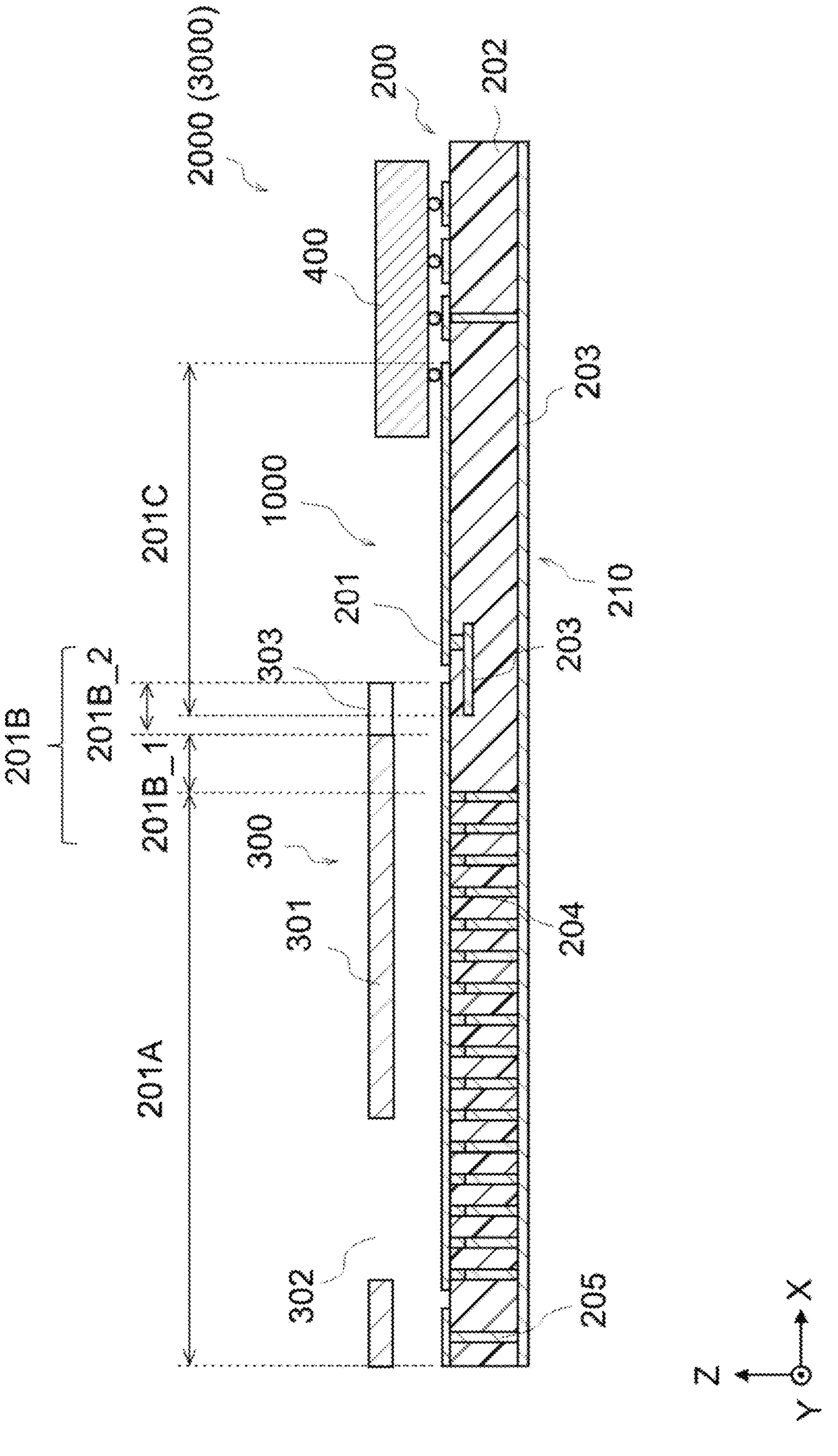
FIG. 27 is a schematic cross-sectional view of the radar device including the antenna device according to a seventh modification example.

FIG. 27 is a schematic cross-sectional view of the radar device 2000 including the antenna device 1000 according to a seventh modification example. In the embodiment mentioned above, as depicted in FIG. 7 and the like, the third conductor pattern 201C is connected integrally with the second conductor pattern 201B. In the seventh modification example depicted in FIG. 27, the third conductor pattern 201C is physically separated from the second conductor pattern 201B, and is arranged to be capable of electric field coupling with the second conductor pattern 201B. Thereby, separation of DC (direct current) components becomes possible. If the third conductor pattern 201C is electrically connected to the second conductor pattern 201B in such a manner, the third conductor pattern 201C can also be connected by electric field coupling, other than direct connection. Electrical connection also includes indirect connection by electrons that are moving around in a space or the like, other than physical contact or connection for electrical conduction.

The third conductor pattern 201C includes a body section 201C_1, a connecting section (via) 201C_2, and a front end 201C_3. The body section 201C_1 is connected with the front end 201C_3 via the connecting section 201C_2. The front end 201C_3 is arranged inside the dielectric layer 202, and the connecting section 201C_2 connects the front end 201C_3 and the body section 201C_1 on a surface of the board 200. The front end 201C_3 overlaps the second conductor pattern 201B in the Z-axis direction, and is capable of electric field coupling with the second conductor pattern 201B.

A received radio wave is initially propagated by an electric field between the first conductor pattern 201A and the conductor plate 203, and is next propagated by an electric field between the second conductor pattern 201B and each of the conductor plate 301 and the conductor layer 203. Next, this radio wave is transferred by an electric field between the front end 201C_3 and the conductor layer 203, and is last propagated by an electric field between the body section 201C_1 and the conductor layer 203. In such a manner, without connecting the third conductor pattern 201C to the second conductor pattern 201B, a received radio wave signal can be transferred to the IC chip 400 by a simple configuration.

Figure 28:
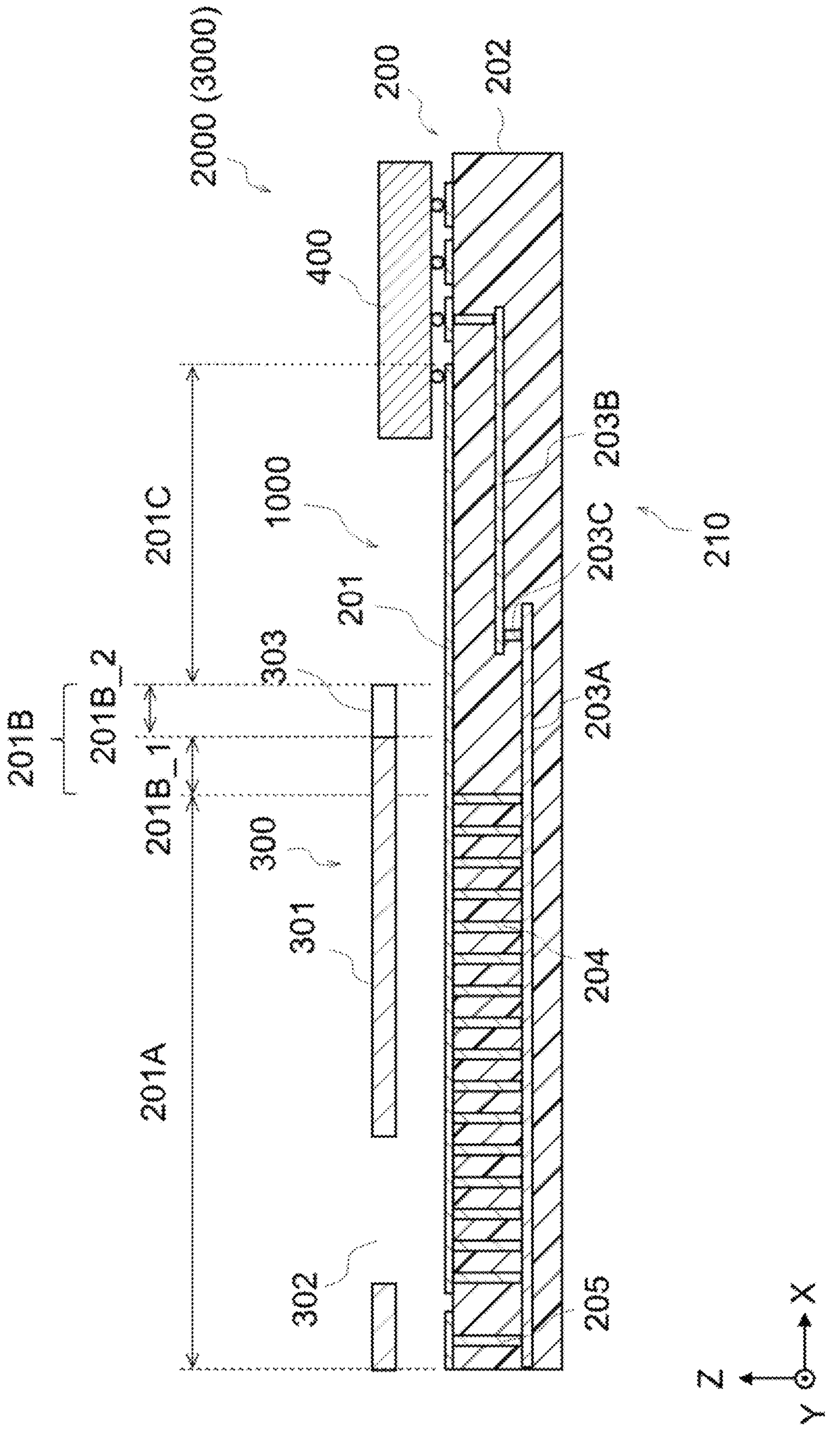
FIG. 28 is a schematic cross-sectional view of the radar device including the antenna device according to an eighth modification example.

FIG. 28 is a schematic cross-sectional view of the radar device 2000 including the antenna device 1000 according to an eighth modification example. The conductor layer 203 includes a conductor layer 203_1 (first conductor layer) and a conductor layer 203_2 (second conductor layer). The conductor layer 203_1 is a portion of the conductor layer 203 that faces the first conductor pattern 201A and the second conductor pattern 201B, and the conductor layer 203_2 is a portion that faces the third conductor pattern 201C. The conductor layers 203_1 and 203_2 are provided inside the dielectric layer 202, and electrically connected via an interlayer connection section 203C (e.g. a via). The conductor layer 203_2 forms the line 210 along with the third conductor pattern 201C and the dielectric layer 202. The line 210 is a microstrip line, but may form another type of line such as a coplanar line. Even in a case where the conductor layer 203 includes multiple layers in such a manner, a received radio wave signal can be transferred to the IC chip 400 by a simple configuration. In addition, this structure can realize a structure that performs impedance conversion between the Gap waveguide side and the chip side. Note that another conductor layer may be provided additionally on the lower surface (a surface in the Z-axis negative direction) of the dielectric layer 202.

3. OVERVIEW OF WIRELESS COMMUNICATION DEVICE

Next, an overview of a wireless communication device 3000 including the antenna device 1000 in the embodiment of the present disclosure is explained with reference to FIG. 1. Instead of or in addition to functions as the radar transmission/reception circuit, for example, the IC chip 400 in the wireless communication device 3000 has a function as a wireless communication circuit that causes the antenna device 1000 to transmit or receive a wireless signal used for a 5G communication system. In addition, the wireless communication device 3000 transmits and receives a radio wave for wireless communication via the antenna device 1000. The wireless communication device 3000 may transmit or receive a signal for wireless communication by a beam.

In the wireless communication device 3000, the IC chip 400 modulates a baseband signal output from the signal processing circuit, which is not depicted, and emits (transmits) the modulated wireless signal via the antenna device 1000. In addition, the IC chip 400 that functions as the wireless communication circuit demodulates a wireless signal received by the antenna device 1000, and outputs the demodulated baseband signal to the signal processing circuit.

4. CONFIGURATION EXAMPLE OF VEHICLE CONTROL SYSTEM

Figure 29:
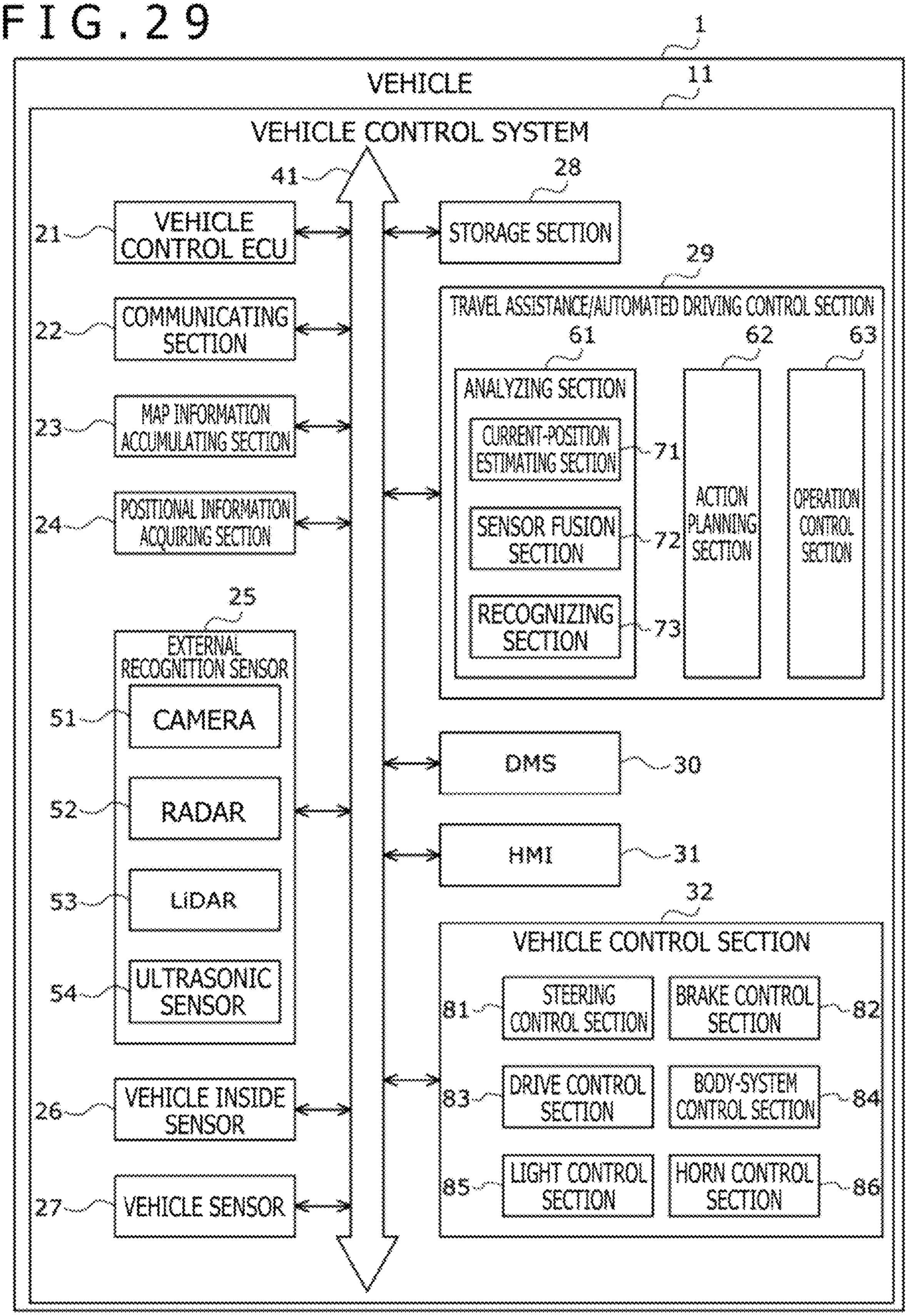
FIG. 29 is a block diagram depicting a configuration example of a vehicle control system.

FIG. 29 is a block diagram depicting a configuration example of a vehicle control system 11 which is an example of a moving device control system to which the present technology is applied.

The vehicle control system 11 is provided to a vehicle 1, and performs processes related to travel assistance and automated driving of the vehicle 1.

The vehicle control system 11 includes a vehicle control ECU (Electronic Control Unit) 21, a communicating section 22, a map information accumulating section 23, a positional information acquiring section 24, an external recognition sensor 25, a vehicle inside sensor 26, a vehicle sensor 27, a storage section 28, a travel assistance/automated driving control section 29, a DMS (Driver Monitoring System) 30, an HMI (Human Machine Interface) 31, and a vehicle control section 32.

The vehicle control ECU 21, the communicating section 22, the map information accumulating section 23, the positional information acquiring section 24, the external recognition sensor 25, the vehicle inside sensor 26, the vehicle sensor 27, the storage section 28, the travel assistance/automated driving control section 29, the driver monitoring system (DMS) 30, the human machine interface (HMI) 31, and the vehicle control section 32 are mutually communicatively connected via a communication network 41. For example, the communication network 41 includes a CAN (Controller Area Network), an LIN (Local Interconnect Network), a LAN (Local Area Network), a vehicle-mounted communication network compliant with a digital bidirectional communication standard such as FlexRay (registered trademark) or Ethernet (registered trademark), a bus, or the like. Different types of network may be used as the communication network 41 depending on the types of transferred data. For example, a CAN may be applied to data related to vehicle control, and Ethernet may be applied to data with a large volume. Note that each section of the vehicle control system 11 bypasses the communication network 41, and is directly connected using wireless communication that is performed on the assumption that communication is performed over a relatively short distance such as, for example, near field communication (NFC) or Bluetooth (registered trademark), in some cases.

Note that, hereinbelow, in a case where each section of the vehicle control system 11 performs communication via the communication network 41, descriptions of the communication network 41 are omitted. For example, in a case where the vehicle control ECU 21 and the communicating section 22 perform communication via the communication network 41, it is written simply that the vehicle control ECU 21 and the communicating section 22 perform communication.

For example, the vehicle control ECU 21 includes various types of processor such as a CPU (Central Processing Unit) or an MPU (Micro Processing Unit). The vehicle control ECU 21 controls functions of the entire vehicle control system 11 or part of the vehicle control system 11.

The communicating section 22 communicates with various equipment inside the vehicle and outside the vehicle, other vehicles, servers, base stations, and the like, and performs transmission and reception of various types of data. At this time, the communicating section 22 can perform the communication using multiple communication schemes.

Communication that the communicating section 22 can execute with the outside of the vehicle is explained briefly. For example, the communicating section 22 communicates with a server (hereinbelow, called an external server) or the like that is present on an external network via a base station or an access point by a wireless communication scheme such as 5G (5th Generation Mobile Communication System), LTE (Long Term Evolution), or DSRC (Dedicated Short Range Communications). For example, the external network with which the communicating section 22 communicates is the Internet, a cloud network, or a network unique to a business operator, or the like. The communication scheme by which the communicating section 22 performs the communication with the external network is not limited particularly as long as it is a wireless communication scheme that enables digital bidirectional communication at a predetermined communication speed or faster over a predetermined distance or longer.

In addition, for example, the communicating section 22 can communicate with a terminal near the vehicle by using the P2P (Peer To Peer) technology. For example, the terminal near the vehicle is a terminal attached to a pedestrian or a moving body such as a bicycle that moves at a relatively low speed, a terminal that is positionally fixedly installed in a store or the like, or an MTC (Machine Type Communication) terminal. Furthermore, the communicating section 22 can also perform V2X communication. For example, V2X communication is communication between the vehicle and another entity such as vehicle to vehicle communication with another vehicle, vehicle to infrastructure communication with roadside equipment or the like, vehicle to home communication, or vehicle to pedestrian communication with a terminal carried by a pedestrian or the like.

For example, the communicating section 22 can externally receive (Over The Air) a program for updating software used to control operations of the vehicle control system 11. Furthermore, the communicating section 22 can externally receive map information, traffic information, information regarding the environment around the vehicle 1, or the like. In addition, for example, the communicating section 22 can externally transmit information regarding the vehicle 1, information regarding the environment around the vehicle 1, or the like. For example, information regarding the vehicle 1 that the communicating section 22 externally transmits includes data representing the state of the vehicle 1, results of recognition by a recognizing section 73, and the like. Furthermore, for example, the communicating section 22 performs communication compatible with a vehicle emergency report system such as eCall.

For example, the communicating section 22 receives radio beacons, optical beacons, and electromagnetic waves transmitted by a road traffic information communication system (VICS (Vehicle Information and Communication System) (registered trademark)) such as FM multiplex broadcasting.

Communication that the communicating section 22 can execute with the inside of the vehicle is explained briefly. For example, the communicating section 22 can communicate with each piece of equipment inside the vehicle using wireless communication. For example, the communicating section 22 can perform wireless communication with equipment inside the vehicle by a communication scheme that enables digital bidirectional communication at a predetermined communication speed or faster by wireless communication such as wireless LAN, Bluetooth, NFC, or WUSB (Wireless USB). This is not the sole example, but the communicating section 22 can also communicate with each piece of equipment inside the vehicle using wired communication. For example, the communicating section 22 can communicate with each piece of equipment inside the vehicle by wired communication via a cable connected to a connection terminal, which is not depicted. For example, the communicating section 22 can communicate with each piece of equipment inside the vehicle by a communication scheme that enables digital bidirectional communication at a predetermined communication speed or faster by wired communication such as USB (Universal Serial Bus), HDMI (High-Definition Multimedia Interface) (registered trademark), or MHL (Mobile High-definition Link).

Here, for example, equipment inside the vehicle means equipment not connected to the communication network 41 inside the vehicle. For example, equipment inside the vehicle is assumed to be mobile equipment or wearable equipment carried by an occupant such as a driver, information equipment carried into the inside of the vehicle and temporarily installed inside the vehicle, and the like.

The map information accumulating section 23 accumulates externally-acquired maps and/or maps created at the vehicle 1. For example, the map information accumulating section 23 accumulates three-dimensional high-precision maps, global maps that have precision lower than the high-precision maps and cover larger areas, or the like.

For example, the high-precision maps are dynamic maps, point cloud maps, vector maps, or the like. For example, the dynamic maps are maps including four layers, which are dynamic information, semi-dynamic information, semi-static information, and static information, and are provided from an external server or the like to the vehicle 1. The point cloud maps are maps including point clouds (point group data). For example, the vector maps are maps in which traffic information or the like such as the positions of lanes or traffic lights is associated with the point cloud maps to be compatible with ADAS (Advanced Driver Assistance System) or AD (Autonomous Driving).

For example, the point cloud maps and the vector maps may be provided from an external server or the like, or may be created at the vehicle 1 as maps for performing matching with a local map mentioned later on the basis of results of sensing by cameras 51, radars 52, a LiDAR 53, or the like, and be accumulated in the map information accumulating section 23. In addition, in a case where the high-precision maps are provided from an external server or the like, map data regarding a planned path that the vehicle 1 is about to travel, for example, map data of a several hundred square meters of area along the planned path, is acquired from the external server or the like in order to reduce the amount of communicated data.

The positional information acquiring section 24 receives GNSS (Global Navigation Satellite System) signals from GNSS satellites, and acquires positional information regarding the vehicle 1. The acquired positional information is supplied to the travel assistance/automated driving control section 29. Note that the positional information acquiring section 24 may acquire positional information not necessarily by a scheme using GNSS signals, but by using beacons, for example.

The external recognition sensor 25 includes various types of sensor used for recognition of the situation outside the vehicle 1, and supplies sensor data from each sensor to each section of the vehicle control system 11. The type and number of the sensors included in the external recognition sensor 25 can be any type and number.

For example, the external recognition sensor 25 includes the cameras 51, the radars 52, the LiDAR (Light Detection and Ranging, Laser Imaging Detection and Ranging) 53, and ultrasonic sensors 54. This is not the sole example, but the external recognition sensor 25 may include one or more types of sensors in the cameras 51, the radars 52, the LiDAR 53, and the ultrasonic sensors 54. The number of the cameras 51, the radars 52, the LiDAR 53, and the ultrasonic sensors 54 is not limited particularly as long as they can be really installed on the vehicle 1. In addition, the types of sensor included in the external recognition sensor 25 are not limited by this example, but the external recognition sensor 25 may include other types of sensor. An example of the sensing area of each sensor included in the external recognition sensor 25 is mentioned later.

Note that image-capturing schemes adopted by the cameras 51 are not limited particularly. For example, cameras that adopt various types of image-capturing scheme such as a ToF (Time of Flight) camera, a stereo camera, a monocular camera, or an infrared camera that adopt image-capturing schemes that enable distance measurement can be applied as the cameras 51 as necessary. This is not the sole example, but the cameras 51 may be ones that are not related to distance measurement, but are for simply acquiring captured images.

In addition, for example, the external recognition sensor 25 can include an environment sensor for sensing the environment of the vehicle 1. The environment sensor is a sensor for sensing the environment related to weather, meteorological phenomena, brightness, or the like, and, for example, can include various types of sensor such as a raindrop sensor, a fog sensor, a sunlight sensor, a snow sensor, or an illuminance sensor.

Furthermore, for example, the external recognition sensor 25 includes a microphone used for sensing sounds around the vehicle 1, the positions of sound sources, or the like.

The vehicle inside sensor 26 includes various types of sensor for sensing information regarding the inside of the vehicle, and supplies sensor data from each sensor to each section of the vehicle control system 11. The type and number of the various types of sensor included in the vehicle inside sensor 26 are not limited particularly as long as they can be really installed on the vehicle 1.

For example, the vehicle inside sensor 26 can include one or more types of sensor in a camera, a radar, a seating sensor, a steering wheel sensor, a microphone, and a bio-information sensor. As the camera included in the vehicle inside sensor 26, for example, cameras that adopt various types of image-capturing scheme that enable distance measurement such as a ToF camera, a stereo camera, a monocular camera, or an infrared camera can be used. This is not the sole example, but the camera included in the vehicle inside sensor 26 may be one that is not related to distance measurement, but is for simply acquiring captured images. For example, the bio-information sensor included in the vehicle inside sensor 26 is provided on a seat, a steering wheel, or the like, and senses various types of bio-information regarding an occupant such as a driver.

The vehicle sensor 27 includes various types of sensor for sensing information regarding the state of the vehicle 1, and supplies sensor data from each sensor to each section of the vehicle control system 11. The type and number of the various types of sensor included in the vehicle sensor 27 are not limited particularly as long as they can be really installed on the vehicle 1.

For example, the vehicle sensor 27 includes a speed sensor, an acceleration sensor, an angular velocity sensor (gyro sensor), and an inertial measurement unit (IMU) formed by integrating them. For example, the vehicle sensor 27 includes a steering angle sensor that senses the steering angle of a steering wheel, a yaw rate sensor, an accelerator sensor that senses the operation amount of an accelerator pedal, and a brake sensor that senses the operation amount of a brake pedal. For example, the vehicle sensor 27 includes a rotation sensor that senses the rotation speed of an engine or a motor, an air pressure sensor that senses the air pressure of a tire, a slip rate sensor that senses the slip rate of a tire, and a wheel speed sensor that senses the rotation speed of a wheel. For example, the vehicle sensor 27 includes a battery sensor that senses the remaining capacity and temperature of a battery, and a shock sensor that senses external shocks.

The storage section 28 includes at least one of a non-volatile storage medium and a volatile storage medium, and stores data or programs. For example, the storage section 28 is used as an EEPROM (Electrically Erasable Programmable Read Only Memory) and a RAM (Random Access Memory), and a magnetic storage device such as an HDD (Hard Disc Drive), a semiconductor storage device, an optical storage device, and a magneto-optical storage device can be applied as the storage medium. The storage section 28 stores various types of program and data used by each section of the vehicle control system 11. For example, the storage section 28 includes an EDR (Event Data Recorder) or a DSSAD (Data Storage System for Automated Driving), and stores information regarding the vehicle 1 before and after an event such as an accident, and information acquired by the vehicle inside sensor 26.

The travel assistance/automated driving control section 29 controls travel assistance and automated driving of the vehicle 1. For example, the travel assistance/automated driving control section 29 includes an analyzing section 61, an action planning section 62, and an operation control section 63.

The analyzing section 61 performs a process of analyzing the vehicle 1 and the situation around the vehicle 1. The analyzing section 61 includes a current-position estimating section 71, a sensor fusion section 72, and the recognizing section 73.

The current-position estimating section 71 estimates the current position of the vehicle 1 on the basis of sensor data from the external recognition sensor 25, and high-precision maps accumulated in the map information accumulating section 23. For example, the current-position estimating section 71 generates a local map on the basis of the sensor data from the external recognition sensor 25, and performs matching between the local map and the high-precision maps to thereby estimate the current position of the vehicle 1. For example, the position of the vehicle 1 is represented using the center of the axle of a rear-wheel pair as a reference position.

For example, the local map is a three-dimensional high-precision map created using a technology such as SLAM (Simultaneous Localization and Mapping), an occupancy grid map, or the like. For example, the three-dimensional high-precision map is a point cloud map mentioned above, or the like. The occupancy grid map is a map that has grids with a predetermined size obtained by dividing the three-dimensional or two-dimensional space around the vehicle 1, and represents the object occupancy state of each grid unit. For example, the object occupancy state is represented by the presence/absence or probability of presence of an object. For example, the local map is used also for processes of sensing and recognizing the situation outside the vehicle 1, which are performed by the recognizing section 73.

Note that the current-position estimating section 71 may estimate the current position of the vehicle 1 on the basis of positional information acquired by the positional information acquiring section 24 and sensor data from the vehicle sensor 27.

The sensor fusion section 72 performs a sensor fusion process of combining multiple different types of sensor data (e.g. image data supplied from the cameras 51, and sensor data supplied from the radars 52) and obtaining new information. Examples of the method of combining the different types of sensor data include integration, merging, concatenation, or the like.

The recognizing section 73 executes a sensing process of sensing the situation outside the vehicle 1 and a recognition process of recognizing the situation outside the vehicle 1.

For example, the recognizing section 73 performs the processes of sensing and recognizing the situation outside the vehicle 1 on the basis of information from the external recognition sensor 25, information from the current-position estimating section 71, information from the sensor fusion section 72, and the like.

Specifically, for example, the recognizing section 73 performs processes of sensing and recognizing objects around the vehicle 1, or the like. For example, the object sensing process is a process of sensing the presence/absence, size, form, position, motion, and the like of an object. For example, the object recognition process is a process of recognizing the attribute, such as type, of an object, identifying a particular object, and so on. Note that the sensing process and the recognition process are not necessarily clearly separate processes, but are overlapping processes in some cases.

For example, the recognizing section 73 senses objects around the vehicle 1 by performing clustering to classify point clouds based on sensor data from the radars 52, the LiDAR 53, or the like, into each point group cluster. Thereby, the presence/absence, sizes, shapes, and positions of objects around the vehicle 1 are sensed.

For example, the recognizing section 73 senses a motion of an object around the vehicle 1 by performing tracking to track motions of a point group cluster classified by clustering. Thereby, the speed and advancing direction (movement vector) of the object around the vehicle 1 are sensed.

For example, the recognizing section 73 senses or recognizes vehicles, humans, bicycles, obstacles, structures, roads, traffic lights, traffic signs, road markings, and the like on the basis of image data supplied from the cameras 51. In addition, the recognizing section 73 may recognize the types of objects around the vehicle 1 by performing a recognition process such as semantic segmentation.

For example, the recognizing section 73 can perform a process of recognizing traffic rules around the vehicle 1 on the basis of maps accumulated in the map information accumulating section 23, results of estimation of the current position by the current-position estimating section 71, and results of recognition of objects around the vehicle 1 by the recognizing section 73. By this process, the recognizing section 73 can recognize the positions and states of traffic lights, the content of traffic signs and road markings, the content of traffic regulations, lanes where vehicles can travel, and the like.

For example, the recognizing section 73 can perform a process of recognizing the environment around the vehicle 1. The environment around the vehicle 1 to be recognized by the recognizing section 73 is assumed to include weather, temperature, humidity, brightness, road surface states, and the like.

The action planning section 62 creates an action plan of the vehicle 1. For example, the action planning section 62 creates the action plan by performing processes of path planning and path tracking.

Note that the path planning (Global path planning) is a process of planning a general path from a start to a goal. This path planning includes also a process which is called trajectory planning, and is for performing trajectory generation (Local path planning) of a trajectory, on the planned path, which allows the vehicle 1 to advance safely and smoothly near the vehicle 1 by taking into consideration the movement characteristics of the vehicle 1.

The path tracking is a process of planning operation for allowing the vehicle to travel safely and accurately the path planned in the path planning in a planned length of time. For example, the action planning section 62 can compute a target speed and a target angular velocity of the vehicle 1 on the basis of results of the path tracking process.

The operation control section 63 controls operation of the vehicle 1 in order to realize the action plan created by the action planning section 62.

For example, the operation control section 63 controls a steering control section 81, a brake control section 82, and a drive control section 83 that are included in the vehicle control section 32 mentioned later, to perform acceleration/deceleration control and direction control such that the vehicle 1 advances along the trajectory computed in the trajectory planning. For example, the operation control section 63 performs coordination control aimed for realization of ADAS functions such as collision avoidance or shock reduction, follow-up traveling, cruise control traveling, collision warning about the vehicle 1, or lane deviation warning about the vehicle 1. For example, the operation control section 63 performs coordination control aimed for automated driving by which the vehicle travels autonomously independently of operation by a driver, or the like.

The DMS 30 performs a process of authenticating a driver, a process of recognizing the state of the driver, and the like on the basis of sensor data from the vehicle inside sensor 26, input data input to the HMI 31 mentioned later, and the like. For example, the state of the driver to be recognized is assumed to include physical conditions, the degree of awakening, the degree of concentration, the fatigue, the line-of-sight direction, the degree of drunkenness, driving operation, the posture, and the like.

Note that the DMS 30 may perform a process of authenticating occupants other than the driver, and a process of recognizing the states of the occupants. In addition, for example, the DMS 30 may perform a process of recognizing the situation of the inside of the vehicle on the basis of sensor data from the vehicle inside sensor 26. For example, the situation of the inside of the vehicle to be recognized is assumed to include temperature, humidity, brightness, smells, and the like.

The HMI 31 is used for inputting various types of data, instructions, and the like, and presents various types of data to a driver and the like.

Data input on the HMI 31 is explained briefly. The HMI 31 includes an input device used by a human to input data. The HMI 31 generates an input signal on the basis of data, instructions, or the like input by using the input device, and supplies the input signal to each section of the vehicle control system 11. As the input device, for example, the HMI 31 includes operators such as a touch panel, a button, a switch, or a lever. This is not the sole example, but the HMI 31 may further include an input device that can input information by a method not involving manual operation, but involving sounds, gestures, or the like. Furthermore, for example, the HMI 31 may use, as an input device, externally connected equipment such as a remote control device that uses infrared rays or radio waves, or mobile equipment or wearable equipment that supports operation of the vehicle control system 11.

Data presentation by the HMI 31 is explained briefly. The HMI 31 generates visual information, auditory information, and tactile information regarding occupants or the outside of the vehicle. In addition, the HMI 31 performs output control of controlling the output, output content, output timing, output method, and the like of each piece of the generated information. For example, as visual information, the HMI 31 generates and outputs information represented by images or light such as monitor images representing operation screens, state display regarding the vehicle 1, warning display, or the situation around the vehicle 1. In addition, as auditory information, for example, the HMI 31 generates and outputs information represented by sounds such as audio guidance, beeps, or warning messages. Furthermore, as tactile information, for example, the HMI 31 generates and outputs information to be given to the tactile sensation of an occupant by force, vibration, motion, or the like.

For example, a display device that presents the visual information by displaying images by itself, and a projector device that presents the visual information by projecting images can be applied as output devices to which the HMI 31 outputs the visual information. Note that, other than a typical display device having a display, for example, the display device may be also a device that displays the visual information in the visual field of an occupant such as a head-up display, a transmission display, or a wearable device having an AR (Augmented Reality) function. In addition, the HMI 31 can also use, as an output device that outputs the visual information, a display device that a navigation device, an instrument panel, a CMS (Camera Monitoring System), an electronic mirror, a lamp, or the like provided to the vehicle 1 has.

For example, an audio speaker, headphones, or earphones can be applied as output devices to which the HMI 31 outputs the auditory information.

For example, a haptic element using a haptic technology can be applied as output devices to which the HMI 31 outputs the tactile information. For example, the haptic element is provided at a portion where an occupant of the vehicle 1 contacts such as a steering wheel or a seat.

The vehicle control section 32 controls each section of the vehicle 1. The vehicle control section 32 includes the steering control section 81, the brake control section 82, the drive control section 83, a body-system control section 84, a light control section 85, and a horn control section 86.

The steering control section 81 performs sensing and control of the state of the steering system of the vehicle 1, and the like. For example, the steering system includes a steering mechanism including a steering wheel or the like, electric power steering, and the like. For example, the steering control section 81 includes a steering ECU that controls the steering system, an actuator that drives the steering system, and the like.

The brake control section 82 performs sensing and control of the state of the brake system of the vehicle 1, and the like. For example, the brake system includes a brake mechanism including a brake pedal or the like, an ABS (Antilock Brake System), a regenerative brake mechanism, and the like. For example, the brake control section 82 includes a brake ECU that controls the brake system, an actuator that drives the brake system, and the like.

The drive control section 83 performs sensing and control of the state of the drive system of the vehicle 1, and the like. For example, the drive system includes an accelerator pedal, a drive force generating device for generating drive force such as an internal combustion engine or a drive motor, a drive force transmission mechanism for transmitting the drive force to wheels, and the like. For example, the drive control section 83 includes a drive ECU that controls the drive system, an actuator that drives the drive system, and the like.

The body-system control section 84 performs sensing and control of the state of the body system of the vehicle 1, and the like. For example, the body system includes a keyless entry system, a smart key system, a power window device, a power seat, an air-conditioning device, airbags, seat belts, a shift lever, and the like. For example, the body-system control section 84 includes a body system ECU that controls the body system, an actuator that drives the body system, and the like.

The light control section 85 performs sensing and control of the states of various types of lights of the vehicle 1, and the like. For example, lights to be controlled is assumed to be headlights, backlights, fog lights, turn signals, brake lights, projection, bumper display, and the like. The light control section 85 includes a light ECU that controls lights, actuators that drive the lights, and the like.

The horn control section 86 performs sensing and control of the state of a car horn of the vehicle 1, and the like. For example, the horn control section 86 includes a horn ECU that controls the car horn, an actuator that drives the car horn, and the like.

Figure 30:
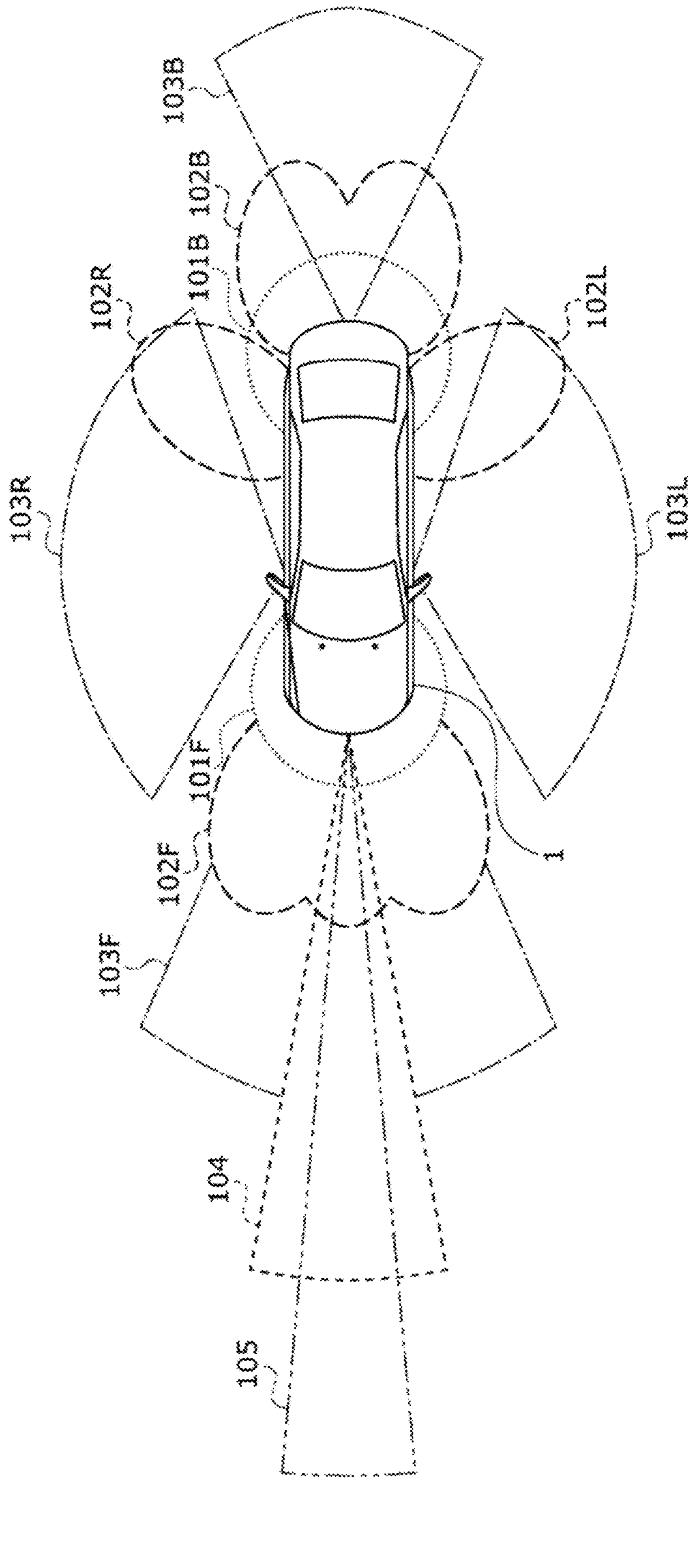
FIG. 30 is a view depicting an example of sensing areas.

FIG. 30 is a view depicting an example of sensing areas of the cameras 51, the radars 52, the LiDAR 53, the ultrasonic sensors 54, and the like of the external recognition sensor 25 depicted in FIG. 29. Note that FIG. 30 schematically depicts the state of the vehicle 1 as seen from above. The left end side is the front end (front) side of the vehicle 1, and the right end side is the rear end (rear) side of the vehicle 1.

A sensing area 101F and a sensing area 101B represent an example of sensing areas of the ultrasonic sensors 54. The sensing area 101F covers the vicinity of the front end of the vehicle 1 with the multiple ultrasonic sensors 54. The sensing area 101B covers the vicinity of the rear end of the vehicle 1 with the multiple ultrasonic sensors 54.

For example, results of sensing in the sensing area 101F and the sensing area 101B are used for parking assistance of the vehicle 1, and the like.

A sensing area 102F to a sensing area 102B represent an example of sensing areas of short-range or middle-range radars 52. In front of the vehicle 1, the sensing area 102F covers positions farther than the sensing area 101F. Behind the vehicle 1, the sensing area 102B covers positions farther than the sensing area 101B. The sensing area 102L covers the vicinity behind the left side surface of the vehicle 1. The sensing area 102R covers the vicinity behind the right side surface of the vehicle 1.

For example, results of sensing in the sensing area 102F are used for sensing vehicles, pedestrians, and the like that are in front of the vehicle 1, and the like. For example, results of sensing in the sensing area 102B are used for a function to prevent collisions behind the vehicle 1, and the like. For example, results of sensing in the sensing area 102L and the sensing area 102R are used for sensing objects in blind spots on the side of the vehicle 1, and the like.

A sensing area 103F to a sensing area 103B represent an example of sensing areas of the cameras 51. In front of the vehicle 1, the sensing area 103F covers positions farther than the sensing area 102F. Behind the vehicle 1, the sensing area 103B covers positions farther than the sensing area 102B. The sensing area 103L covers the vicinity of the left side surface of the vehicle 1. The sensing area 103R covers the vicinity of the right side surface of the vehicle 1.

For example, results of sensing in the sensing area 103F can be used for recognition of traffic lights and traffic signs, a lane deviation prevention assistance system, and an automatic headlight control system. For example, results of sensing in the sensing area 103B can be used for parking assistance and a surround view system. For example, results of sensing in the sensing area 103L and the sensing area 103R can be used for the surround view system.

A sensing area 104 represents an example of a sensing area of the LiDAR 53. In front of the vehicle 1, the sensing area 104 covers positions farther than the sensing area 103F. On the other hand, the sensing area 104 has a narrower range in the left-right direction than the sensing area 103F.

For example, results of sensing in the sensing area 104 are used for sensing objects such as nearby vehicles.

A sensing area 105 represents an example of a sensing area of a long-range radar 52. In front of the vehicle 1, the sensing area 105 covers positions farther than the sensing area 104. On the other hand, the sensing area 105 has a narrower range in the left-right direction than the sensing area 104.

For example, results of sensing in the sensing area 105 are used for ACC (Adaptive Cruise Control), emergency braking, collision avoidance, and the like.

Note that the sensing area of each sensor of the cameras 51, the radars 52, the LiDAR 53, and the ultrasonic sensors 54 included in the external recognition sensor 25 may be configured in various manners other than that depicted in FIG. 30. Specifically, the ultrasonic sensors 54 may perform sensing also of the side of the vehicle 1, and the LiDAR 53 may perform sensing of the back of the vehicle 1. In addition, the installation position of each sensor is not limited to an example mentioned above. In addition, the number of each type of sensor may be one or may be more than one.

5. SUMMARY

As mentioned above, according to the technology of the present disclosure, the antenna device having a structure in which the gap waveguide and the microstrip line are connected by using the EBG elements can convert an electric field on the board and an electric field in the board while reducing side leakage of the electric fields by the EBG elements, and accordingly conversion between the gap waveguide and the microstrip line becomes possible even with a simple configuration. In addition, according to the technology of the present disclosure, the low-loss and high-performance MRGW structure can also be incorporated on one board. Furthermore, the technology of the present disclosure can also be applied to circuits not only of radar devices using antenna devices, but also of various devices such as wireless communication devices or transfer devices.

6. SUPPLEMENTARY NOTES

Whereas a suitable embodiment of the present disclosure has been explained in detail thus far with reference to the attached figures, the technical scope of the present disclosure is not limited to the example. For those with ordinary knowledge in the technical field of the present disclosure, it is obvious that various types of modified example or corrected example can be conceived of within the scope of the technical idea described in claims, and it is understood that those various types of modified example or corrected example certainly belong to the technical scope of the present disclosure.

In addition, advantages described in the present specification are merely explanatory or illustrative, but are not limitative. That is, along with the advantages described above or instead of the advantages described above, the technology according to the present disclosure can achieve other advantages that are obvious to those skilled in the art from the description of the present specification.

Note that configurations like the ones below also belong to the technical scope of the present disclosure.

[Item 1]

An antenna device including:

a board including a conductor layer;

a first conductor pattern arranged on a surface of the board;

a connecting section that connects the first conductor pattern to the conductor layer;

a second conductor pattern that has one end side connected to one end side of the first conductor pattern, has a length which is equal to or longer than approximately ¼ of an operating wavelength, and is arranged on the surface of the board;

multiple first electromagnetic bandgap elements arranged on both sides of the first conductor pattern in a longitudinal direction on the board;

multiple second electromagnetic bandgap elements arranged on both sides of the second conductor pattern in a longitudinal direction on the board;

a conductor plate that faces the first conductor pattern; and a third conductor pattern that has one end side connected to another end side of the second conductor pattern and is arranged on the surface of the board.

[Item 2]

The antenna device according to Item 1, in which a distance, from the second conductor pattern, of a position where the multiple second electromagnetic bandgap elements are arranged is shorter than ¼ wavelength.

[Item 3]

The antenna device according to Item 1 or 2, in which the first, second, and third conductor patterns are microstrip lines.

[Item 4]

The antenna device according to any one of Items 1 to 3, in which the second conductor pattern has a first portion located on a side of the second conductor pattern closer to the first conductor pattern, and a second portion located on a side opposite to the first portion, and the first portion faces the conductor plate, and the second portion does not face the conductor plate.

[Item 5]

The antenna device according to Item 4, in which the conductor plate has a shape having a cut at a portion facing the second portion.

[Item 6]

The antenna device according to any one of Items 1 to 5, in which the board further includes a dielectric layer, the first conductor pattern is provided on a surface of the dielectric layer, and the connecting section includes multiple vias that penetrate the dielectric layer and connect the first conductor pattern to the conductor layer.

[Item 7]

The antenna device according to Item 6, in which each of the first electromagnetic bandgap elements and the second electromagnetic bandgap elements includes a conductor piece provided on the surface of the dielectric layer, and multiple vias that penetrate the dielectric layer and connect the conductor piece and the conductor layer.

[Item 8]

The antenna device according to any one of Items 1 to 7, in which the board further includes a dielectric layer, and the first conductor pattern, the second conductor pattern, and the third conductor pattern are provided on a surface of the dielectric layer.

[Item 9]

The antenna device according to Item 8, in which the conductor layer includes a first conductor layer connected to the first conductor pattern by the connecting section, a second conductor layer provided on a layer different from the first conductor layer, and an interlayer connection section that connects the first conductor layer and the second conductor layer.

[Item 10]

The antenna device according to Item 8 or 9, in which a transfer line is formed by the third conductor pattern, a portion of the conductor layer that faces the third conductor pattern, and a portion of the dielectric layer that is located between the third conductor pattern and the portion of the conductor layer.

[Item 11]

The antenna device according to any one of Items 1 to 10, in which a width of the second conductor pattern is smaller than a width of the first conductor pattern.

[Item 12]

The antenna device according to Item 11, in which the second conductor pattern has a shape that is tapered in a direction from the first conductor pattern toward the third conductor pattern.

[Item 13]

The antenna device according to Item 11 or 12, in which a width of the third conductor pattern is smaller than the width of the first conductor pattern.

[Item 14]

The antenna device according to any one of Items 1 to 13, including:

an air layer between the board and the conductor plate.

[Item 15]

The antenna device according to any one of Items 1 to 14, including:

a dielectric layer between the board and the conductor plate.

[Item 16]

The antenna device according to any one of Items 1 to 15, in which the first conductor pattern is provided on a surface of the conductor layer, and the connecting section is a contact surface that contacts the conductor layer of the first conductor pattern.

[Item 17]

The antenna device according to any one of Items 1 to 16, in which the conductor plate has, at a portion thereof facing the first conductor pattern, a slot that emits a radio wave.

[Item 18]

A radar device including:

an antenna device; and a radar transmission/reception circuit that causes the antenna device to transmit or receive a radar wave, in which the antenna device includes a board including a conductor layer, a first conductor pattern arranged on a surface of the board, a connecting section that connects the first conductor pattern to the conductor layer, a second conductor pattern that has one end side connected to one end side of the first conductor pattern and has a length which is equal to or longer than approximately ¼ of an operating wavelength, multiple first electromagnetic bandgap elements arranged on both sides of the first conductor pattern in a longitudinal direction on the board, multiple second electromagnetic bandgap elements arranged on both sides of the second conductor pattern in a longitudinal direction on the board, a conductor plate that faces the first conductor pattern, and a third conductor pattern that has one end side connected to another end side of the second conductor pattern and is arranged on the surface of the board.

[Item 19]

A transfer device including:

a board including a conductor layer;

a first conductor pattern arranged on a surface of the board;

a connecting section that connects the first conductor pattern to the conductor layer;

a second conductor pattern that has one end side connected to one end side of the first conductor pattern, has a length which is equal to or longer than approximately ¼ of an operating wavelength, and is arranged on the surface of the board;

multiple first electromagnetic bandgap elements arranged on both sides of the first conductor pattern in a longitudinal direction on the board;

multiple second electromagnetic bandgap elements arranged on both sides of the second conductor pattern in a longitudinal direction on the board;

a conductor plate that faces the first conductor pattern; and a third conductor pattern that has one end side connected to another end side of the second conductor pattern and is arranged on the surface of the board.

[Item 20]

A signal reception method including:

receiving a radio wave signal via a slot provided through a conductor plate facing a surface of a board;

transferring the signal by a first electric field formed between the conductor plate and a first conductor pattern that is provided on the surface of the board and is connected to a conductor layer of the conductor plate via a connecting section;

after transferring the signal by the first electric field, transferring the signal by a second electric field formed between each of part of the conductor layer that faces a second conductor pattern and the conductor plate, and the second conductor pattern that has one end side connected to one end side of the first conductor pattern and has a length which is equal to or longer than approximately ¼ of an operating wavelength; and after transferring the signal by the second electric field, transferring the signal by a third electric field formed between a third conductor pattern that has one end side electrically connected to another end side of the second conductor pattern and part of the conductor layer that faces the third conductor pattern.

REFERENCE SIGNS LIST

1000: Antenna device
2000: Radar device
3000: Wireless communication device
200: Board
201: Conductor pattern
201A: First conductor pattern
201B: Second conductor pattern
201B_1: First portion
201B_2: Second portion
201C: Third conductor pattern
201C_1: Body section
201C_2: Connecting section
201C_3: Front end
202: Dielectric layer
203: Conductor layer
203C: Interlayer connection section
203_P: Connecting section
204: Via
205, 206: Electromagnetic bandgap element (EBG element)
205A, 206A: Conductor piece
205B, 206B: Via
207: Projection
208: EBG element
209: Board
210: Line (microstrip line)
300: Structure
301: Conductor plate
302: Slot
303: Cut
304: Protrusion
305: Dielectric layer
400: IC chip
1: Vehicle
11: Vehicle control system
21: Vehicle control ECU (Electronic Control Unit)
22: Communicating section
23: Map information accumulating section
24: Positional information acquiring section
25: External recognition sensor
26: Vehicle inside sensor
27: Vehicle sensor
28: Storage section
29: Travel assistance/automated driving control section
30: Driver monitoring system (DMS)
31: Human machine interface (HMI)
32: Vehicle control section
41: Communication network
51: Camera
52: Radar
53: LiDAR
54: Ultrasonic sensor
61: Analyzing section
62: Action planning section
63: Operation control section
71: Current-position estimating section
72: Sensor fusion section
73: Recognizing section

81: Steering control section
82: Brake control section
83: Drive control section
84: Body-system control section
85: Light control section
86: Horn control section

The invention claimed is:

1. An antenna device comprising:
a board including a conductor layer;
a first conductor pattern arranged on a surface of the board;
a connecting section that connects the first conductor pattern to the conductor layer;
a second conductor pattern that has one end side connected to one end side of the first conductor pattern, has a length which is equal to or longer than approximately ¼ of an operating wavelength, and is arranged on the surface of the board;
multiple first electromagnetic bandgap elements arranged on both sides of the first conductor pattern in a longitudinal direction on the board;
multiple second electromagnetic bandgap elements arranged on both sides of the second conductor pattern in a longitudinal direction on the board;
a conductor plate that faces the first conductor pattern; and
a third conductor pattern that has one end side connected to another end side of the second conductor pattern and is arranged on the surface of the board;
wherein the second conductor pattern has a first portion located on a side of the second conductor pattern closer to the first conductor pattern, and a second portion located on a side opposite to the first portion, and the first portion faces the conductor plate, and the second portion and the third conductor pattern do not face the conductor plate.

2. The antenna device according to claim 1, wherein a distance, from the second conductor pattern, of a position where the multiple second electromagnetic bandgap elements are arranged is shorter than ¼ wavelength.

3. The antenna device according to claim 1, wherein the first, second, and third conductor patterns are microstrip lines.

4. The antenna device according to claim 1, wherein the conductor plate has a shape having a cut at a portion facing the second portion.

5. The antenna device according to claim 1, wherein
the board further includes a dielectric layer,
the first conductor pattern is provided on a surface of the dielectric layer, and
the connecting section includes multiple vias that penetrate the dielectric layer and connect the first conductor pattern to the conductor layer.

6. The antenna device according to claim 5, wherein
each of the first electromagnetic bandgap elements and the second electromagnetic bandgap elements includes
a conductor piece provided on the surface of the dielectric layer, and
multiple vias that penetrate the dielectric layer and connect the conductor piece and the conductor layer.

7. The antenna device according to claim 1, wherein
the board further includes a dielectric layer, and
the first conductor pattern, the second conductor pattern, and the third conductor pattern are provided on a surface of the dielectric layer.

8. The antenna device according to claim 7, wherein
the conductor layer includes
a first conductor layer connected to the first conductor pattern by the connecting section,
a second conductor layer provided on a layer different from the first conductor layer, and
an interlayer connection section that connects the first conductor layer and the second conductor layer.

9. The antenna device according to claim 7, wherein a transfer line is formed by the third conductor pattern, a portion of the conductor layer that faces the third conductor pattern, and a portion of the dielectric layer that is located between the third conductor pattern and the portion of the conductor layer.

10. The antenna device according to claim 1, wherein a width of the second conductor pattern is smaller than a width of the first conductor pattern.

11. The antenna device according to claim 10, wherein the second conductor pattern has a shape that is tapered in a direction from the first conductor pattern toward the third conductor pattern.

12. The antenna device according to claim 10, wherein a width of the third conductor pattern is smaller than the width of the first conductor pattern.

13. The antenna device according to claim 1, comprising:
an air layer between the board and the conductor plate.

14. The antenna device according to claim 1, comprising:
a dielectric layer between the board and the conductor plate.

15. The antenna device according to claim 1, wherein
the first conductor pattern is provided on a surface of the conductor layer, and
the connecting section is a contact surface that contacts the conductor layer of the first conductor pattern.

16. The antenna device according to claim 1, wherein the conductor plate has, at a portion thereof facing the first conductor pattern, a slot that emits a radio wave.

17. A radar device comprising:
an antenna device; and
a radar transmission/reception circuit that causes the antenna device to transmit or receive a radar wave, wherein
the antenna device includes
a board including
a conductor layer,
a first conductor pattern arranged on a surface of the board,
a connecting section that connects the first conductor pattern to the conductor layer,
a second conductor pattern that has one end side connected to one end side of the first conductor pattern and has a length which is equal to or longer than approximately ¼ of an operating wavelength,
multiple first electromagnetic bandgap elements arranged on both sides of the first conductor pattern in a longitudinal direction on the board,
multiple second electromagnetic bandgap elements arranged on both sides of the second conductor pattern in a longitudinal direction on the board,
a conductor plate that faces the first conductor pattern, and
a third conductor pattern that has one end side connected to another end side of the second conductor pattern and is arranged on the surface of the board;
wherein the second conductor pattern has a first portion located on a side of the second conductor pattern closer to the first conductor pattern, and a second portion located on a side opposite to the first portion, and the first portion faces the conductor plate, and the second portion and the third conductor pattern do not face the conductor plate.

18. A transfer device comprising:
a board including a conductor layer;
a first conductor pattern arranged on a surface of the board;
a connecting section that connects the first conductor pattern to the conductor layer;
a second conductor pattern that has one end side connected to one end side of the first conductor pattern, has a length which is equal to or longer than approximately ¼ of an operating wavelength, and is arranged on the surface of the board;
multiple first electromagnetic bandgap elements arranged on both sides of the first conductor pattern in a longitudinal direction on the board;
multiple second electromagnetic bandgap elements arranged on both sides of the second conductor pattern in a longitudinal direction on the board;
a conductor plate that faces the first conductor pattern; and
a third conductor pattern that has one end side connected to another end side of the second conductor pattern and is arranged on the surface of the board;
wherein the second conductor pattern has a first portion located on a side of the second conductor pattern closer to the first conductor pattern, and a second portion located on a side opposite to the first portion, and the first portion faces the conductor plate, and the second portion and the third conductor pattern do not face the conductor plate.

* * * * *